(12) United States Patent
Hinchliff

(10) Patent No.: US 9,168,672 B2
(45) Date of Patent: Oct. 27, 2015

(54) KNIFE WITH DISPOSABLE INSERTS

(71) Applicant: Thomas Charles Hinchliff, Sherwood, OR (US)

(72) Inventor: Thomas Charles Hinchliff, Sherwood, OR (US)

(73) Assignee: Key Knife, Inc., Tualatin, OR (US)

( * ) Notice: Subject to any disclaimer, the term of this patent is extended or adjusted under 35 U.S.C. 154(b) by 269 days.

(21) Appl. No.: 13/752,108

(22) Filed: Jan. 28, 2013

(65) Prior Publication Data

US 2014/0027552 A1 Jan. 30, 2014

Related U.S. Application Data

(60) Provisional application No. 61/675,184, filed on Jul. 24, 2012.

(51) Int. Cl.
| | |
|---|---|
| *B02C 18/18* | (2006.01) |
| *B27L 11/00* | (2006.01) |
| *B27G 13/00* | (2006.01) |
| *B27G 13/10* | (2006.01) |
| *B23C 5/20* | (2006.01) |

(52) U.S. Cl.
CPC .............. *B27L 11/005* (2013.01); *B02C 18/18* (2013.01); *B23C 5/20* (2013.01); *B27G 13/00* (2013.01); *B27G 13/10* (2013.01)

(58) Field of Classification Search
CPC ...... B27L 11/005; B27G 13/00; B27G 13/02; B27G 13/04; B27G 13/06; B27G 13/08; B27G 13/10; B02C 18/18
USPC ................... 241/294; 83/699.11, 694
See application file for complete search history.

(56) References Cited

U.S. PATENT DOCUMENTS

| | | | |
|---|---|---|---|
| 5,100,070 A * | 3/1992 | Montgomery, Sr. | ........ 241/294 |
| 7,159,626 B2 | 1/2007 | Biller et al. | |
| 8,534,580 B2 | 9/2013 | Rice et al. | |
| 2010/0043922 A1 * | 2/2010 | Leonardi et al. | ............ 144/235 |

FOREIGN PATENT DOCUMENTS

| | | |
|---|---|---|
| DE | 195 36 704 A1 | 4/1997 |
| EP | 1 122 045 A1 | 8/2001 |
| WO | WO 99/59784 A2 | 11/1999 |
| WO | WO 2004/085124 A1 | 10/2004 |
| WO | 2013/051650 | 2/2015 |

OTHER PUBLICATIONS

International Search Report for PCT/US2013/051650, dated Oct. 4, 2013.
Concise Explanation of Relevance of Documents not in the English Language.

* cited by examiner

*Primary Examiner* — Mark Rosenbaum
(74) *Attorney, Agent, or Firm* — Portland Intellectual Property, LLC

(57) ABSTRACT

A knife with disposable inserts. Either (1) a front side of the knife body has a cutting edge, the front side of the insert is removably mounted to a rear side of the knife body, and either (A) a rear side of the insert has a cutting edge, or (B) the rear side of the insert has a blunt face that forms a rear side of the knife; or (2) a rear side of the knife body has a blunt face that forms the rear side of the knife, the rear side of the insert is removably mounted to the front side of the knife body, and the front side of the insert has a cutting edge.

24 Claims, 12 Drawing Sheets

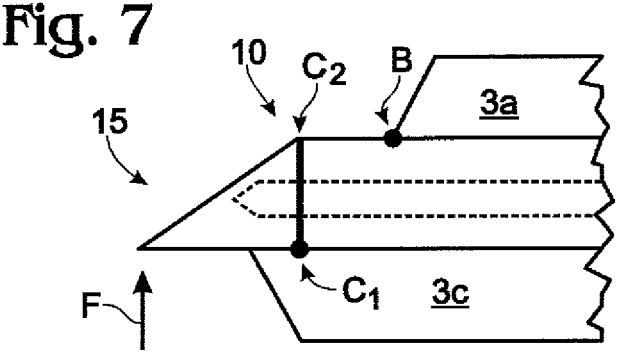
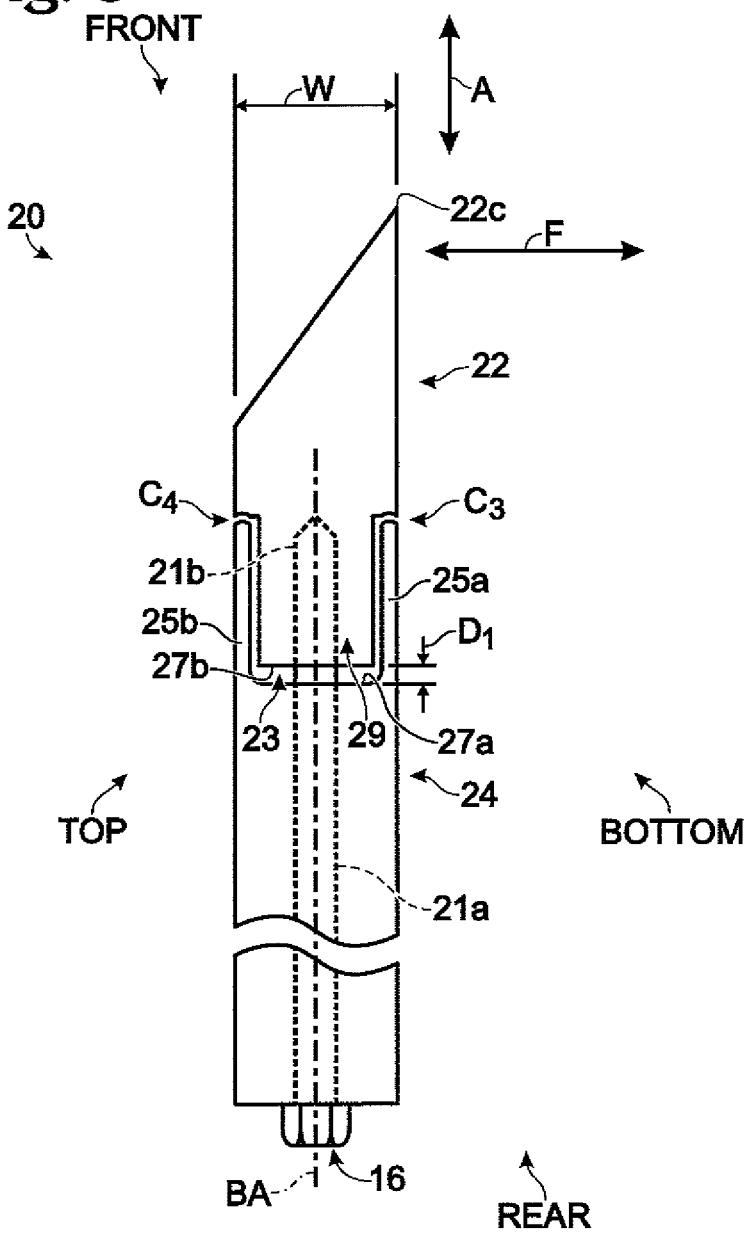

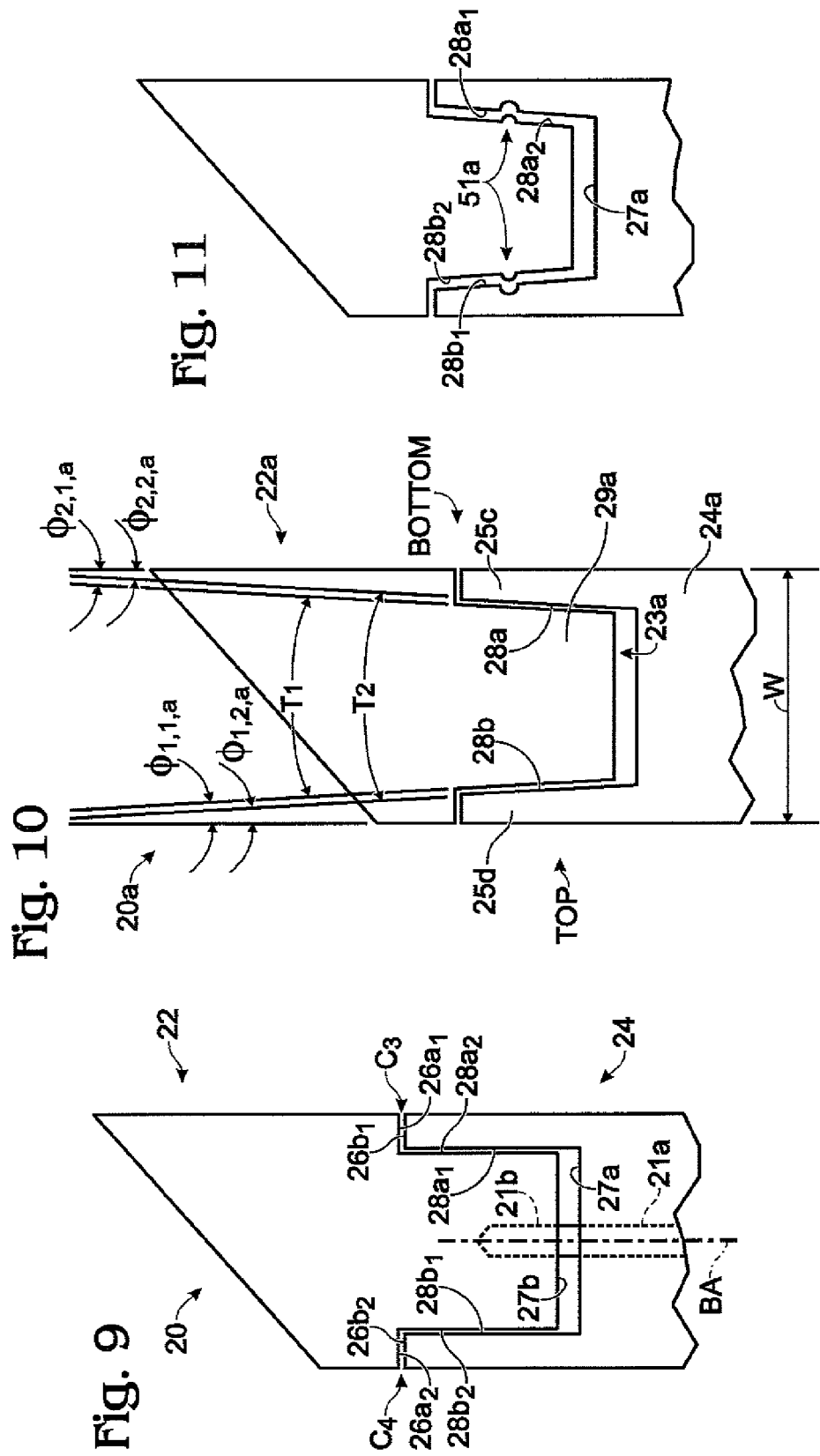

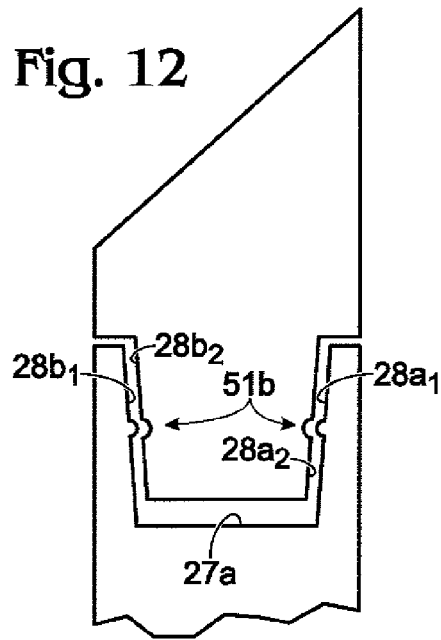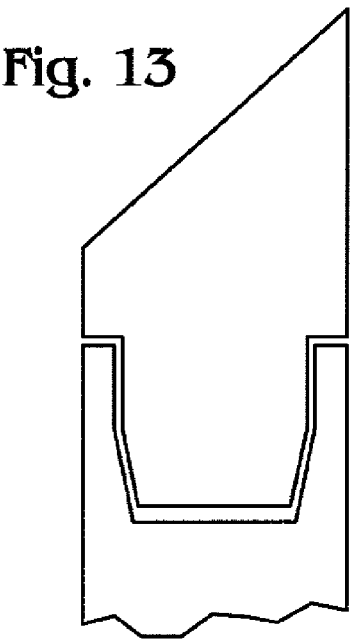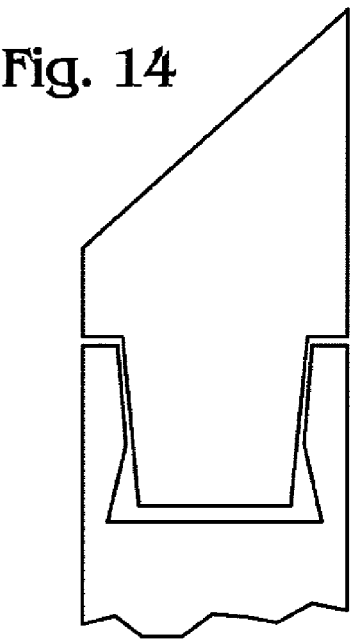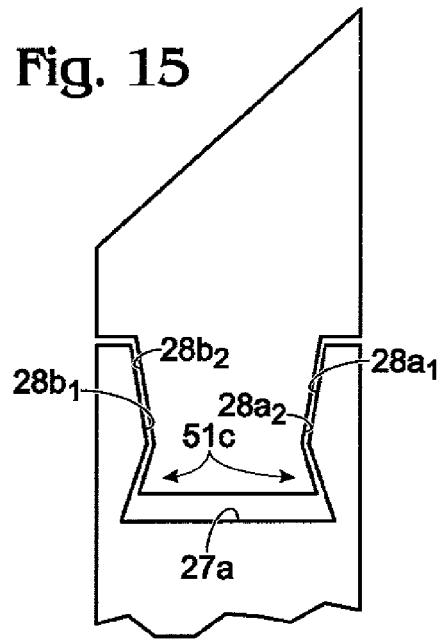

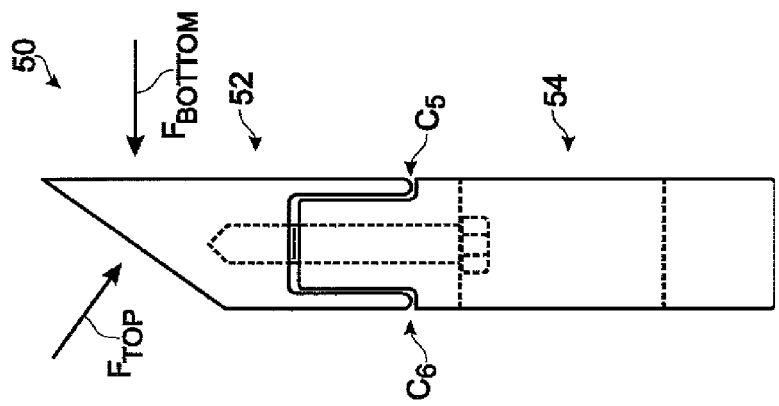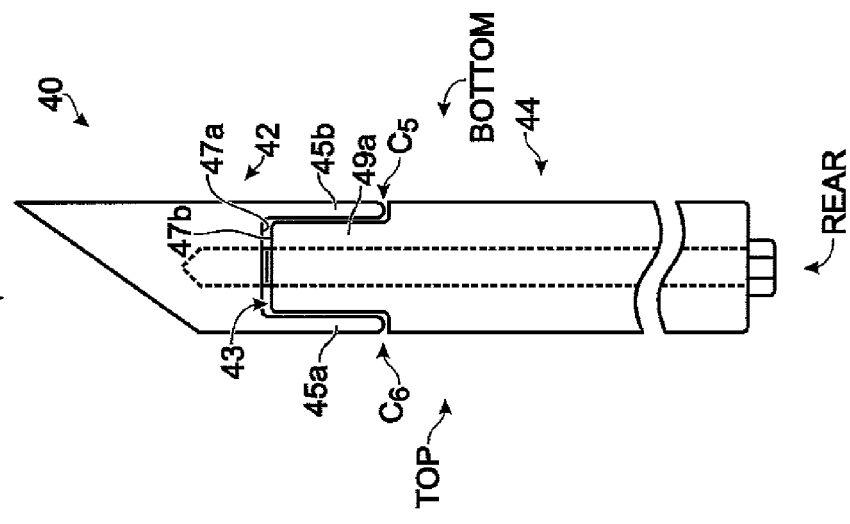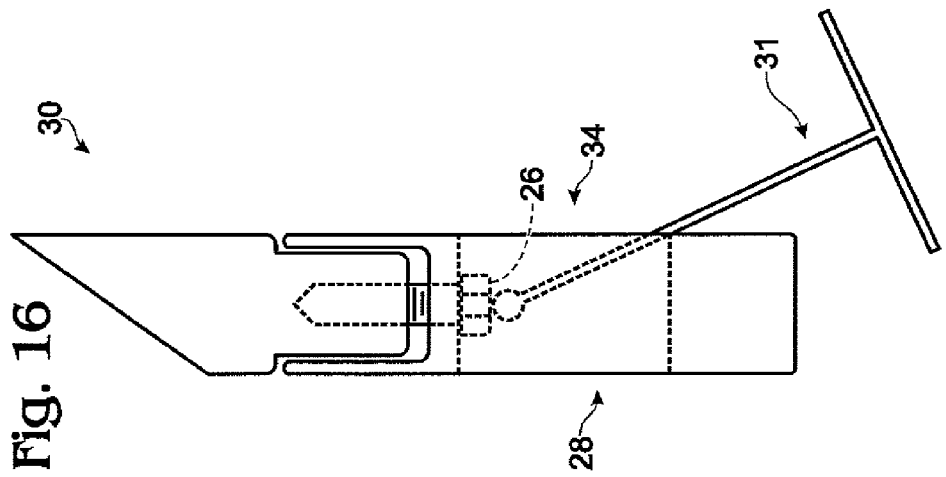

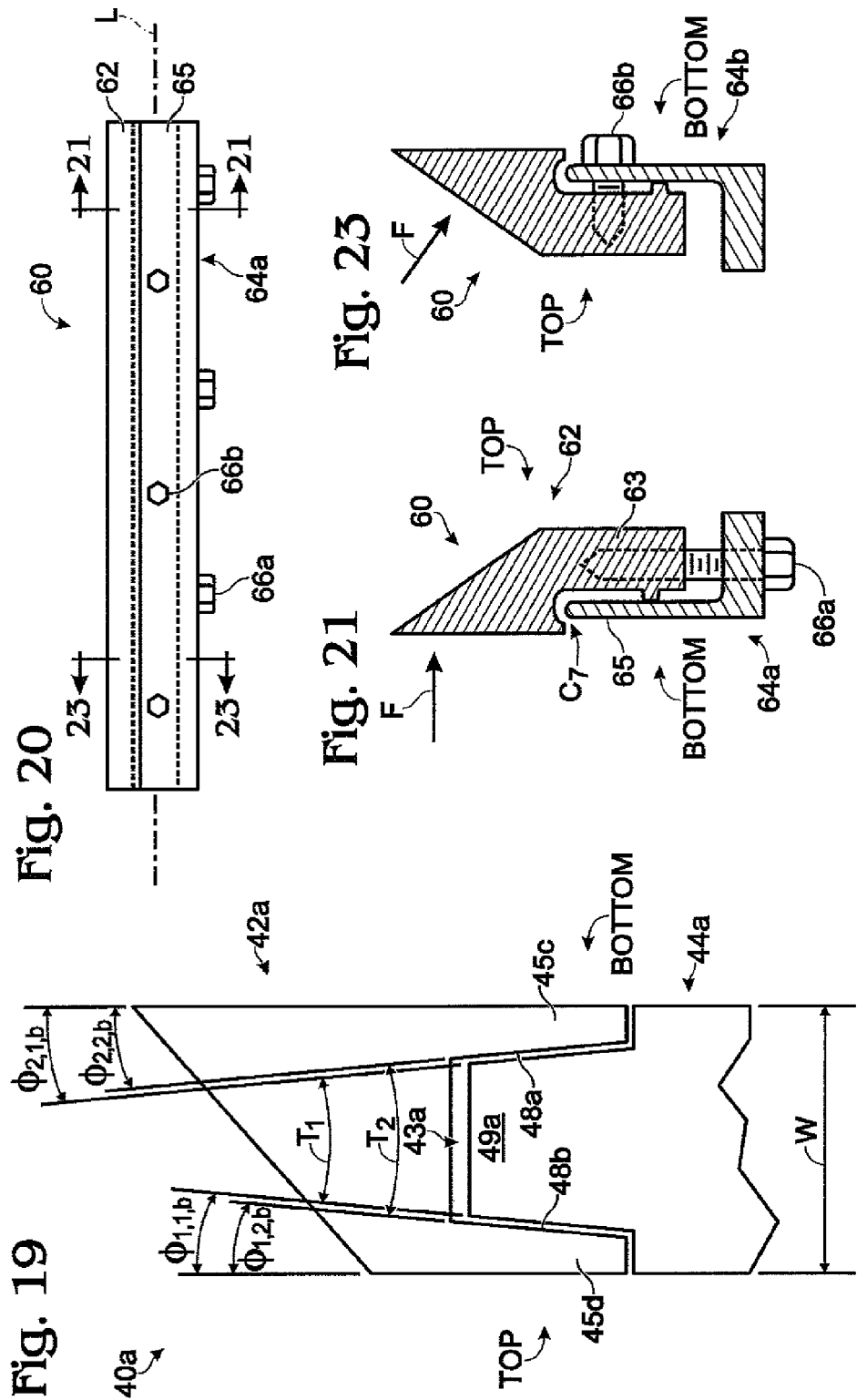

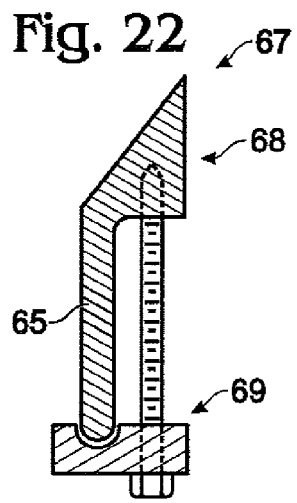
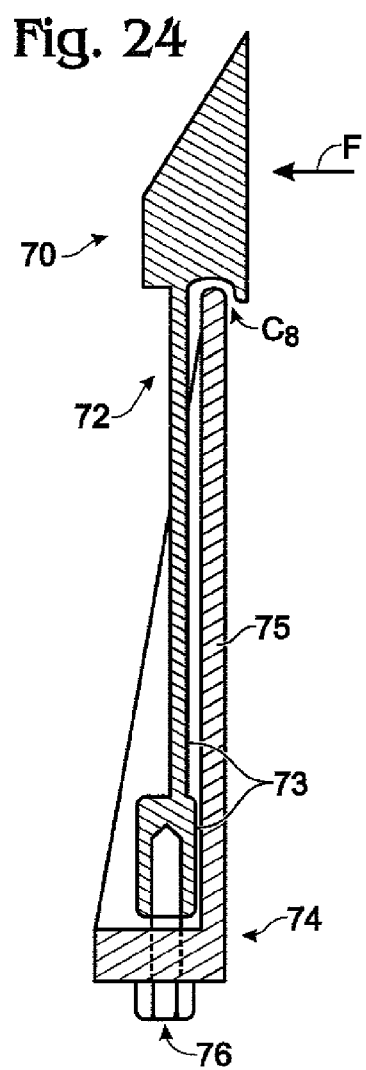
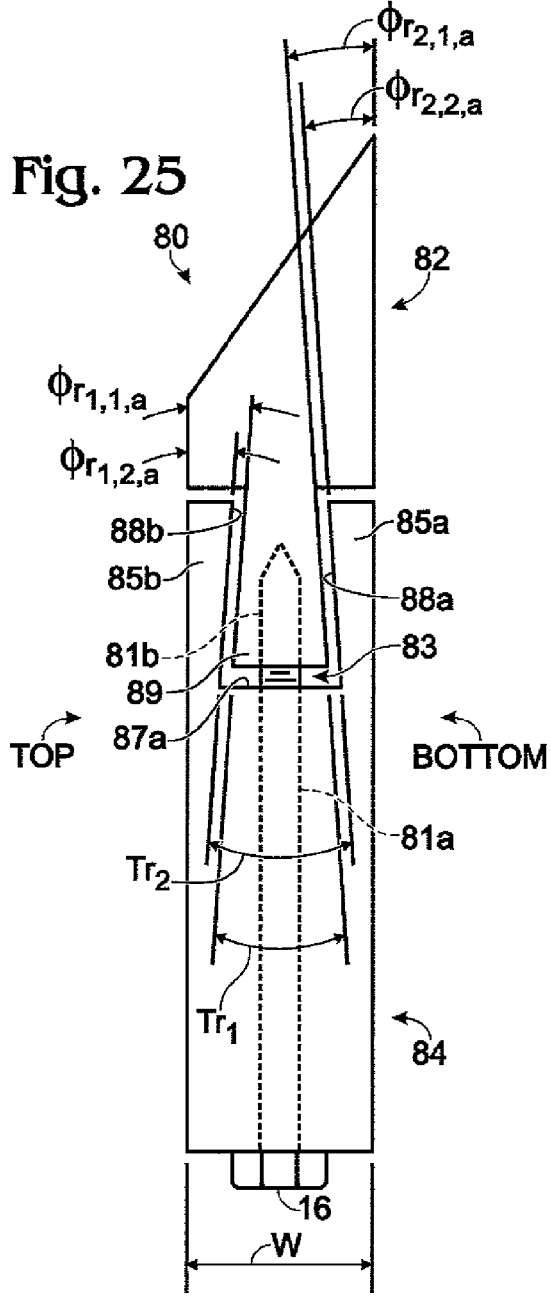

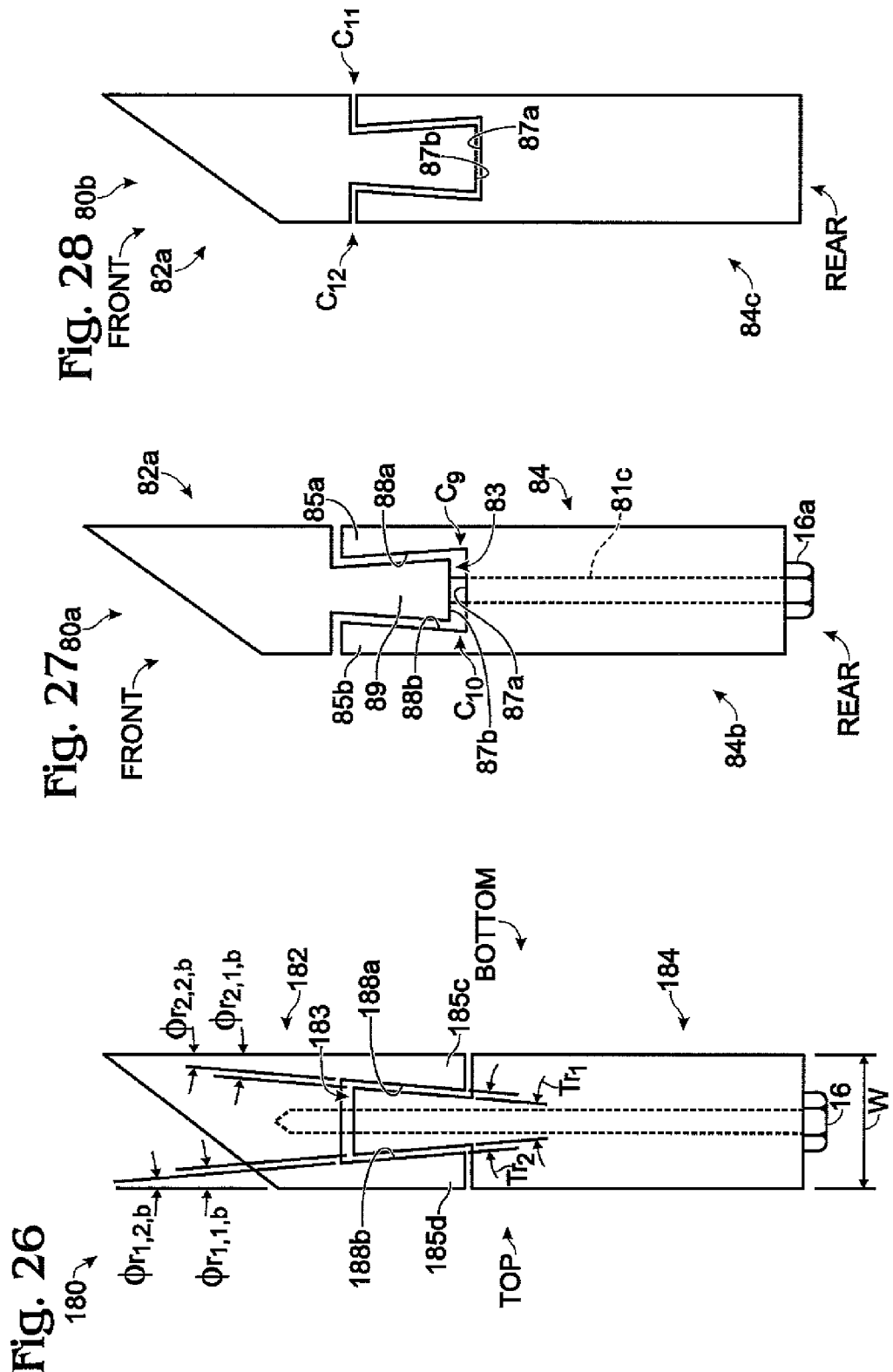

KNIFE WITH DISPOSABLE INSERTS

RELATED APPLICATIONS

This application claims priority of U.S. 61/675,184, filed Jul. 24, 2012.

FIELD OF THE INVENTION

The present invention relates to knives of the type that are typically used in cutting, chipping and planing logs in a sawmill to produce lumber and chips from the logs.

BACKGROUND

Specialized knives are used in industrial wood processing machines such as chippers, canters, and planers. A plurality of such knives are replaceably mounted to a rotating cutting head. The wood is fed toward the head so that it will come into interference with the knives, whereupon the rotation of the knives causes the knives to cut chips, wafers, strands, or shavings from the wood. This can be either or both for the purpose of shaping the wood to a desired configuration, or for producing the cuttings as commercially desired end products.

The knives have cutting edges that should remain sharp for as long as practical, and the knives must be strong enough to withstand the tremendous forces applied to them as they impact the wood at high rates of speed. The earliest such knives were large, monolithic plates of metal bolted directly to the cutting head, one side of which were cut to form an acute angle for use as a cutting edge. An example is shown in FIG. 1. Such knives are still in use today, but there is a problem. The cutting edge must be repeatedly renewed (by grinding), the knives must be removed from the cutting apparatus to perform this maintenance, and the weight of the knives makes them difficult to handle.

To address this problem, the art evolved smaller, lighter knives clamped in supporting structures to form "knife assemblies." Typically, a knife assembly has a knife clamped between upper and lower clamping members, with the lower clamping member being bolted to the cutting head rather than the knife itself. An example is shown in FIG. 2 with reference to a direction of rotation "R," where a knife assembly 3 is shown which includes the knife of FIG. 1 (referenced as 2) clamped between upper and lower clamping members 3a and 3b, respectively.

Also shown in FIG. 2 is an optional structure 3c known as a "counterknife" or "wear insert." Both the knife 2 and the counterknife or wear insert 3c are relatively small parts that are the focus of the wear imposed upon the knife assembly, and both of these parts can be relatively easily handled for repair or replacement due to their significantly reduced mass as compared to the remainder of the knife assembly.

By use of the knife assembly, a knife could be made small enough that, in view of its reduced material cost, it could be cost-effective to dispose of the knife rather than perform the maintenance required to keep its cutting edge fresh after it has become worn.

Another important development in the art was the double-sided knife, an example being shown in FIG. 3. As the name implies, the double-sided knife has two cutting edges on opposite sides thereof. Thus, when the first cutting edge wears, the knife can be removed from the knife assembly, turned end-for-end, and reinstalled in the knife assembly to expose a fresh new cutting edge, doubling the cutting life of the knife.

Despite these important developments in the art, large, unsupported and therefore heavy knives such as that shown in FIG. 2 continue to be used in existing, legacy wood processing machines, and there remain a number of operators of industrial wood processing machines that are well adapted for maintaining knives, and prefer to service a knife to extend its life rather than replace it with a disposable version. But further improvements in cost efficiency would be desirable, and continued progress in making the strategy of disposing of worn knives rather than repairing them cost effective would also be desirable.

SUMMARY

A knife with disposable inserts is disclosed herein. The knife has a top surface, a bottom surface, and two sides, namely a front side having a cutting edge and defining an acute cutting angle and an opposed rear side. The cutting angle establishes, in a selected reference plane perpendicular to the cutting edge, a first reference axis that bisects the cutting angle and a second reference axis perpendicular to the first reference axis.

In a first embodiment of the knife, a cutting edge insert for the knife may be provided with the following features: The cutting edge insert includes the cutting edge and a threaded insert mounting hole for mounting the insert to the knife, wherein the axis of the mounting hole is closer to being in alignment with the first reference axis than the second reference axis.

In a first variation of the first embodiment, the axis of the insert mounting hole may be perpendicular to the cutting edge.

In a second variation of the first embodiment, the cutting edge insert may be provided in combination with a knife body for removably mounting the insert. For use in conjunction with an insert having an insert mounting hole, the knife body may have a corresponding body mounting hole adapted to align with the insert mounting hole when the insert is mounted to the knife body.

In a third variation of the first embodiment, a fastener having a threaded end may be provided, the fastener for insertion through the body mounting hole, the threaded end for threading into the insert mounting hole. In such case, the insert and knife body may be cooperatively adapted so that, when the fastener is inserted through the body mounting hole and the threaded end is threaded into the cutting edge insert mounting hole and tightened to produce an operative, assembled configuration of the knife, the insert is drawn against the knife body at contacting surfaces of the interface therebetween, and respective interlocking portions of the body and knife body are drawn into interlocking relationship.

In a fourth variation of the first embodiment, where the knife body defines, in the selected reference plane, overall length and width dimensions measured perpendicular to each other, the overall length dimension may be at least twice the overall width dimension, and the axis of the body mounting hole may be closer to being in alignment with the overall length dimension than the overall width dimension.

In a fifth variation of the first embodiment, where the knife body defines opposed top and bottom surfaces that define lines in the selected reference plane, at least principal portions of which are parallel to each other, the knife body therefore defining in the selected reference plane an overall length measured parallel to the principle portions, the axis of the body mounting hole may be substantially parallel to the overall length dimension.

Any of the first, second, third, fourth, and fifth variations of the first embodiment may be provided separately or in combination with any one or more of the others of these variations without limitation.

In a second embodiment, a knife assembly for a cutting head adapted for rotating the knife assembly is provided. The knife assembly includes a knife having opposed top and bottom surfaces intersecting so as to define a cutting edge and an acute cutting angle at the cutting edge, an upper clamping member, a lower clamping member, a first bolt extending through at least one of the upper and lower clamping members and into the cutting head for clamping the knife between the upper and lower clamping members to the cutting head, and a second bolt, wherein the knife is formed of at least two discrete portions, namely, a knife body and an insert which are cooperatively adapted for being drawn together so as to form an operative assembled configuration of the knife as a result of the second bolt being passed through at least a portion of one of the knife body and insert and being threadably received in the other of the knife body and insert, and so that one or more contacting surfaces of the interface between the knife body and insert make contact and thereby may sustain at least a majority of the resulting compressive force.

In a first variation of the second embodiment, one of the knife body and insert may have a threaded hole therein to provide for the second bolt being threadably received in the other of the knife body and cutting edge insert portions, wherein, in a selected reference plane perpendicular to the cutting edge and intersected by the axis of the threaded hole, there may be at least two of the contacting surfaces disposed, respectively, on opposite sides of the reference plane.

In a second variation of the second embodiment, intended to be combined with the first variation thereof, and with the top and bottom surfaces of the knife establishing a width dimension therebetween, the contacting surfaces in a selected one of the knife body and insert may be provided at respective ends of spaced-apart walls separated by a bottoming surface, the walls and bottoming surface defining a cavity, wherein the other of the knife body and insert may have a reduced-width portion, the cavity for receiving the reduced-width portion of the knife body between the walls such that the reduced-width portion may be spaced from the bottoming surface.

In combination with the first and second variations of the second embodiment, the width of the reduced-width portion may generally decrease in the direction of increasing proximity to the bottoming surface; it may steadily decrease and define an angle of taper; and the walls of the cavity may have side surfaces facing the reduced-width portion defining an included angle therebetween that equals or exceeds the angle of taper.

Alternatively, the width of the reduced-width portion may generally increase in the direction of increasing proximity to the bottoming surface; it may steadily increase and define an angle of reverse taper; and the walls of the cavity may have side surfaces facing the reduced-width portion defining an included angle therebetween that equals or exceeds the angle of reverse taper.

In all variations of the second embodiment, the bottoming surface and walls may be either part of the knife body or part of the insert.

In a third embodiment, a knife is provided having a top surface, a bottom surface, and two sides, namely a front side having a first cutting edge establishing an acute cutting angle and an opposed rear side. The knife includes a knife body having one or more body mounting holes therethrough establishing respective body mounting hole axes, and one or more inserts, each having a threaded insert mounting hole establishing an insert mounting hole axis which, in an operative, assembled configuration of the knife in which the one or more inserts are attached to the knife body, is aligned with a corresponding one of the one or more body hole mounting axes, to allow for drawing each of the one or more inserts tightly to the knife body by use of associated threaded fasteners extending through respective ones of the body mounting holes into the respective insert mounting holes; each insert may include one of the following two groups of features: (1) the first cutting edge is an integral part of the insert wherein, with the cutting angle establishing, in a selected reference plane perpendicular thereto, a first reference axis that bisects the cutting angle and a second reference axis perpendicular to the first reference axis, the axis of the insert mounting hole is closer to being in alignment with the first reference axis than the second reference axis; or (2) the insert is separate and apart from the first cutting edge, and forms the rear side of the knife.

In a first aspect of the third embodiment, a selected first one of the one or more inserts includes feature set (1).

In a first variation of the first aspect of the third embodiment, with the top and bottom surfaces of the knife establishing a width dimension therebetween, the first insert may have two sides, namely, a front side forming the first cutting edge and an opposed rear side; and the knife body may have two sides, namely, a front side for receiving the first insert and an opposed rear side forming the rear side of the knife, the front side of the knife body having a reduced-width wall projecting forwardly toward the first insert, the wall having an end adapted for resting against the rear side of the first insert such that the wall may provide at least the primary resistance to forces imposed on the first insert and knife body in a direction parallel to the axis of the first insert mounting hole.

In a second variation of the first aspect of the third embodiment, intended as an alternative to the first variation thereof, and with the top and bottom surfaces of the knife establishing a width dimension therebetween, the first insert may have two sides, namely, a front side forming the first cutting edge and an opposed rear side having a reduced-width wall projecting rearwardly toward the knife body; and the knife body may have two sides, namely, a front side for receiving the first insert and an opposed rear side forming the rear side of the knife, the front side of the knife body adapted for resting against an end of the wall such that the wall may provide at least the primary resistance to forces imposed on the first insert and knife body in a direction parallel to the axis of the first insert mounting hole.

In a third variation of the first aspect of the third embodiment, intended as an alternative to the first and second variations thereof, and with the top and bottom surfaces of the knife establishing a width dimension therebetween, the first insert may have two sides, namely, a front side forming the first cutting edge and an opposed rear side having a reduced-width portion projecting rearwardly toward the knife body; and the knife body may have two sides, namely, a front side for receiving the first insert and an opposed rear side forming the rear side of the knife, the front side of the knife body having a cavity defining a bottoming surface situated between two spaced-apart walls projecting forwardly away from the bottoming surface and toward the first insert, the cavity adapted to receive the reduced-width portion of the first insert between the walls such that selected other portions of the first insert rest against respective ends of the walls with the reduced-width portion being spaced apart from the bottoming surface, and thereby the walls may provide at least the primary resistance to forces imposed on the first insert and knife body in a direction parallel to the axis of the first insert mounting hole.

In combination with the third variation of the first aspect of the third embodiment, the width of the reduced-width portion may generally decrease in the direction of increasing proximity to the bottoming surface; it may steadily decrease and define an angle of taper; and the walls of the cavity may have side surfaces facing the reduced-width portion defining an included angle therebetween that equals or exceeds the angle of taper.

Alternatively, the width of the reduced-width portion may generally decrease in the direction of increasing proximity to the knife body; it may steadily increase and define an angle of reverse taper; and the walls of the cavity may have side surfaces facing the reduced-width portion defining an included angle therebetween that equals or exceeds the angle of reverse taper.

In a fourth variation of the first aspect of the third embodiment, intended as an alternative to the first, second, and third variations thereof, and with the top and bottom surfaces of the knife establishing a width dimension therebetween, the first insert may have two sides, namely, a front side forming the first cutting edge and an opposed back side having a cavity defining a bottoming surface situated between two spaced-apart walls projecting rearwardly away from the bottoming surface and toward the knife body; and the knife body may have two sides, namely, a front side for receiving the first insert and an opposed rear side forming the rear side of the knife, the front side of the knife body having a reduced-width portion projecting forwardly toward the first insert, the cavity adapted to receive the reduced-width portion of the knife body between the walls such that selected other portions of the knife body rest against respective ends of the walls with the reduced-width portion being spaced apart from the bottoming surface, and thereby the walls may provide at least the primary resistance to forces imposed on the first insert and knife body in a direction parallel to the axis of the first insert mounting hole.

In combination with the fourth variation of the first aspect of the third embodiment, the width of the reduced-width portion may generally decrease in the direction of increasing proximity to the bottoming surface; it may steadily decrease and define an angle of taper; and the walls of the cavity may have side surfaces facing the reduced-width portion defining an included angle therebetween that equals or exceeds the angle of taper.

Alternatively, the width of the reduced-width portion may generally increase in the direction of increasing proximity to the bottoming surface; it may steadily increase and define an angle of reverse taper; and the walls of the cavity may have side surfaces facing the reduced-width portion defining an included angle therebetween that equals or exceeds the angle of reverse taper.

In a fifth variation of the first aspect of the third embodiment, intended as an alternative to the first, second, third, and fourth variations thereof, the first insert may have two sides, namely, a front side forming the first cutting edge and an opposed rear side; and the knife body may have two sides, namely, a front side for receiving the first insert and an opposed rear side forming the rear side of the knife, the front side of the knife body having a bottoming surface situated adjacent a wall projecting forwardly away from the bottoming surface and toward the first insert, the front side of the knife body adapted to receive the rear side of the first insert such that the rear side of the first insert rests against an end of the wall with remaining portions of the rear side of the first insert being spaced apart from the bottoming surface, and thereby the wall may provide at least at least the primary resistance to forces imposed on the first insert and knife body in a first direction parallel to the axis of the first insert mounting hole.

In combination with the fifth variation of the first aspect of the third embodiment, the rear side of the first insert may include a first feature, and the end of the wall may include a second feature adapted to interlock with the first feature so as to resist separation of the first insert and knife body in directions perpendicular to said first direction.

In a sixth variation of the first aspect of the third embodiment, intended as an alternative to the first, second, third, fourth, and fifth variations thereof, the first insert may have two sides, namely, a front side forming the first cutting edge and an opposed rear side having a bottoming surface situated adjacent a wall projecting rearwardly away from the bottoming surface and toward the knife body; and the knife body may have two sides, namely, a front side for receiving the first insert and an opposed rear side forming the rear side of the knife, the front side of the knife body for receiving the rear side of the first insert such that the front side of the knife body rests against an end of the wall with remaining portions of the front side of the knife body being spaced apart from the bottoming surface, and thereby the wall may provide at least the primary resistance to forces imposed on the first insert and knife body in a first direction parallel to the axis of the first insert mounting hole.

In combination with the sixth variation of the first aspect of the third embodiment, the front side of the knife body may include a first feature, and the end of the wall may include a second feature adapted to interlock with the first feature so as to resist separation of the first insert and knife body in directions perpendicular to the first direction.

In a second aspect of the third embodiment, there are at least two of inserts having the feature set (1), a first one of the inserts forming the first cutting edge and a second one of the inserts forming the rear side of the knife.

In a first variation of the second aspect of the third embodiment, with the top and bottom sides of the knife establishing a width dimension therebetween, the first insert may have two sides, namely, a front side forming the first cutting edge and an opposed rear side having a reduced-width portion projecting toward the knife body; the second insert may have two sides, namely, a front side having a reduced-width portion projecting toward the knife body and a rear side forming a second cutting edge; and wherein the knife body has two sides, namely, a front side for receiving the first insert and having a first cavity defining a first bottoming surface situated between two spaced-apart first walls projecting forwardly away from the first bottoming surface and toward the first insert, and a rear side for receiving the second insert and having a second cavity defining a second bottoming surface situated between two spaced-apart second walls projecting rearwardly away from the second bottoming surface and toward the second insert, the first cavity adapted to receive the reduced-width portion of the first insert between the first walls such that selected other portions of the first insert rest against respective ends of the first walls with the reduced-width portion of the first insert being spaced apart from the first bottoming surface, thereby the first walls provide at least the primary resistance to forces imposed on the first insert and the knife body in a direction parallel to the axis of the insert mounting hole of the first insert, and the second cavity adapted to receive the reduced-width portion of the second insert between the second walls such that selected other portions of the second insert rest against respective ends of the second walls with the reduced-width portion of the second insert being spaced apart from the second bottoming surface, thereby the second walls may provide at least the primary resistance to forces imposed on the second insert and the knife body in a direction parallel to the axis of the insert mounting hole of the second insert.

In a second variation of the second aspect of the third embodiment, intended as an alternative to the first variation, and with the top and bottom sides of the knife establishing a width dimension therebetween, the first insert may have two sides, namely, a front side forming the first cutting edge and an opposed rear side having a first cavity defining a first bottoming surface situated between two spaced-apart first walls projecting rearwardly away from the first bottoming surface and toward the knife body; the second insert may have two sides, namely, a front side having a second cavity defining a second bottoming surface situated between two spaced-apart second walls projecting forwardly away from the second bottoming surface and toward the knife body, and a rear side forming a second cutting edge; and the knife body may have two sides, namely a front side for receiving the first insert and having a first reduced-width portion projecting forwardly toward the first insert, and a rear side for receiving the second insert and having a second reduced-width portion projecting rearwardly toward the second insert, the first cavity adapted to receive the first reduced-width portion between the first walls such that selected other portions of the first insert rest against respective ends of the first walls with the first reduced-width portion being spaced apart from the first bottoming surface, thereby the first walls may provide at least the primary resistance to forces imposed on the first insert and the knife body in a direction parallel to the axis of the insert mounting hole of the first insert, and the second cavity adapted to receive the second reduced-width portion between the second walls such that selected other portions of the second insert rest against respective ends of the second walls with the second reduced-width portion being spaced apart from the second bottoming surface, thereby the second walls may provide at least the primary resistance to forces imposed on the second insert and the knife body in a direction parallel to the axis of the insert mounting hole of the second insert.

In a third aspect of the third embodiment, there are at least two inserts, a first one of the inserts having the feature set (1) and a second one of the inserts having the feature set (2).

In a first variation of the third aspect of the third embodiment, with the top and bottom sides of the knife establishing a width dimension therebetween, the first insert may have two sides, namely, a front side forming the first cutting edge and an opposed rear side having a reduced-width portion projecting toward the knife body; the second insert may have two sides, namely, a front side having a reduced-width portion projecting toward the knife body and a rear side providing at the rear side of the knife a blunt face suitable for indexing the knife; and the knife body may have two sides, namely, a front side for receiving the first insert and having a first cavity defining a first bottoming surface situated between two spaced-apart first walls projecting forwardly away from the first bottoming surface and toward the first insert, and a rear side for receiving the second insert and having a second cavity defining a second bottoming surface situated between two spaced-apart second walls projecting rearwardly away from the second bottoming surface and toward the second insert, the first cavity adapted to receive the reduced-width portion of the first insert between the first walls such that selected other portions of the first insert rest against respective ends of the first walls with the reduced-width portion of the first insert being spaced apart from the first bottoming surface, thereby the first walls may provide at least the primary resistance to forces imposed on the first insert and the knife body in a direction parallel to the axis of the insert mounting hole of the first insert, and the second cavity adapted to receive the reduced-width portion of the second insert between the second walls such that selected other portions of the second insert rest against respective ends of the second walls with the reduced-width portion of the second insert being spaced apart from the second bottoming surface, thereby the second walls may provide at least the primary resistance to forces imposed on the second insert and the knife body in a direction parallel to the axis of the insert mounting hole of the second insert.

In a second variation of the third aspect of the third embodiment, with the top and bottom sides of the knife establishing a width dimension therebetween, the first insert may have two sides, namely, a front side forming the first cutting edge and an opposed rear side having a first cavity defining a first bottoming surface situated between two spaced-apart first walls projecting rearwardly away from the first bottoming surface and toward the knife body; the second insert may have two sides, namely, a front side having a second cavity defining a second bottoming surface situated between two spaced-apart second walls projecting forwardly away from the second bottoming surface and toward the knife body, and a rear side providing at the rear side of the knife a blunt face suitable for indexing the knife; and the knife body may have two sides, namely a front side for receiving the first insert and having a first reduced-width portion projecting forwardly toward the first insert, and a rear side for receiving the second insert and having a second reduced-width portion projecting rearwardly toward the second insert, the first cavity adapted to receive the first reduced-width portion between the first walls such that selected other portions of the first insert rest against respective ends of the first walls with the first reduced-width portion being spaced apart from the first bottoming surface, thereby the first walls may provide at least the primary resistance to forces imposed on the first insert and the knife body in a direction parallel to the axis of the insert mounting hole of the first insert, and the second cavity adapted to receive the second reduced-width portion between the second walls such that selected other portions of the second insert rest against respective ends of the second walls with the second reduced-width portion being spaced apart from the second bottoming surface, thereby the second walls may provide at least the primary resistance to forces imposed on the second insert and the knife body in a direction parallel to the axis of the insert mounting hole of the second insert.

In a fourth aspect of the third embodiment, a selected first one of the one or more inserts includes feature set (2).

In a first variation of the fourth aspect of the third embodiment, the insert may have two sides, namely, a front side and an opposed rear side providing at the rear side of the knife a blunt face suitable for indexing the knife; and the knife body may have two sides, namely, a front side forming the first cutting edge and an opposed rear side for receiving the insert and having a bottoming surface situated adjacent a wall projecting rearwardly away from the bottoming surface and toward the insert, the rear side of the knife body for receiving the front side of the insert such that the front side of the insert rests against an end of the wall with remaining portions of the front side of the insert being spaced apart from the bottoming surface, and thereby the wall may provide at least at least the primary resistance to forces imposed on the insert and knife body in a first direction parallel to the axis of the insert mounting hole.

In combination with the first variation of the fourth aspect of the third embodiment, the front side of the insert may include a first feature, and the end of the wall may include a second feature adapted to interlock with the first feature so as to resist separation of the insert and knife body in directions perpendicular to said first direction.

In a second variation of the fourth aspect of the third embodiment, the insert may have two sides, namely, a front side and an opposed rear side providing at the rear side of the knife a blunt face suitable for indexing the knife; and the knife body may have two sides, namely, a front side forming the first cutting edge and an opposed rear side for receiving the insert, the front side of the insert having a bottoming surface situated adjacent a wall projecting rearwardly away from the bottoming surface and toward the knife body, the rear side of the knife body for receiving the front side of the insert such that the rear side of the knife body rests against an end of the wall with remaining portions of the rear side of the knife body being spaced apart from the bottoming surface, and thereby the wall may provide at least the primary resistance to forces imposed on the insert and knife body in a first direction parallel to the axis of the insert mounting hole.

In combination with the second variation of the fourth aspect of the third embodiment, the rear side of the knife body may include a first feature, and the end of the wall may include a second feature adapted to interlock with the first feature so as to resist separation of the insert and knife body in directions perpendicular to said first direction.

In a third variation of the fourth aspect of the third embodiment, with the top and bottom surfaces of the knife establishing a width dimension therebetween, the insert may have two sides, namely, a front side and an opposed rear side providing at the rear side of the knife a blunt face suitable for indexing the knife; and the knife body may have two sides, namely, a front side forming the first cutting edge and an opposed rear side for receiving the insert, the front side of the insert having a reduced-width portion projecting forwardly toward the knife body, the rear side of the knife body having a cavity defining a bottoming surface situated between two spaced-apart walls projecting rearwardly away from the bottoming surface and toward the insert, the cavity adapted to receive the reduced-width portion of the insert between the walls such that selected other portions of the insert rest against respective ends of the walls with the reduced-width portion being spaced apart from the bottoming surface, and thereby the walls may provide at least the primary resistance to forces imposed on the insert and knife body in a direction parallel to the axis of the insert mounting hole.

In combination with the third variation of the fourth aspect of the third embodiment, the width of the reduced-width portion may generally decrease in the direction of increasing proximity to the bottoming surface; it may steadily decrease and define an angle of taper; and the walls of the cavity may have side surfaces facing the reduced-width portion defining an included angle therebetween that equals or exceeds the angle of taper.

Alternatively, the width of the reduced-width portion may generally increase in the direction of increasing proximity to the bottoming surface; it may steadily increase and define an angle of reverse taper; and the walls of the cavity may have side surfaces facing the reduced-width portion defining an included angle therebetween that equals or exceeds the angle of reverse taper.

In a fourth variation of the fourth aspect of the third embodiment, with the top and bottom surfaces of the knife establishing a width dimension therebetween, the insert may have two sides, namely, a front side and an opposed rear side providing at the rear side of the knife a blunt face suitable for indexing the knife; and the knife body may have two sides, namely, a front side forming the first cutting edge and an opposed rear side for receiving the insert, the front side of the insert having a cavity defining a bottoming surface situated between two spaced-apart walls projecting forwardly away from the bottoming surface and toward the knife body, the rear side of the insert having a reduced-width portion projecting rearwardly toward the insert, the cavity adapted to receive the reduced-width portion of the insert between the walls such that selected other portions of the insert rest against respective ends of the walls with the reduced-width portion being spaced apart from the bottoming surface, and thereby the walls may provide at least the primary resistance to forces imposed on the insert and knife body in a direction parallel to the axis of the insert mounting hole.

In combination with the fourth variation of the fourth aspect of the third embodiment, the width of the reduced-width portion may generally decrease in the direction of increasing proximity to the bottoming surface; it may steadily decrease and define an angle of taper; and the walls of the cavity may have side surfaces facing the reduced-width portion defining an included angle therebetween that equals or exceeds the angle of taper.

Alternatively, the width of the reduced-width portion may generally increase in the direction of increasing proximity to the bottoming surface; it may steadily increase and define an angle of reverse taper; and the walls of the cavity may have side surfaces facing the reduced-width portion defining an included angle therebetween that equals or exceeds the angle of reverse taper.

In a fourth embodiment, a knife having a top surface, a bottom surface, and two sides, namely a front side having a cutting edge establishing an acute cutting angle and an opposed rear side is provided. The knife includes a knife body having two sides, namely a front side forming the cutting edge and an opposed rear side; and a removable insert having two sides, namely, a front side and an opposed rear side providing at the rear side of the knife a blunt face suitable for indexing the knife.

In a first aspect of the fourth embodiment, with the top and bottom surfaces of the knife establishing a width dimension therebetween, the knife body and insert together may satisfy one of the following two conditions: (1) the front side of the insert has a bottoming surface situated adjacent a wall projecting forwardly away from the bottoming surface and toward the knife body, the rear side of the knife body for receiving the front side of the insert such that the rear side of the knife body rests against an end of the wall with remaining portions of the rear side of the knife body being spaced apart from the bottoming surface; and (2) the rear side of the knife body has a bottoming surface situated adjacent a wall projecting rearwardly away from the bottoming surface and toward the insert, the rear side of the knife body for receiving the front side of the insert such that the front side of the insert rests against an end of the wall with remaining portions of the front side of the insert being spaced apart from the bottoming surface.

In combination with the first aspect of the fourth embodiment, under condition (1) the rear side of the knife body may include a first feature, under condition (2) the front side of the insert may include a first feature, and under either condition (1) or (2), the end of the wall may include a second feature adapted to interlock with the first feature so as to resist separation of the insert and knife body in directions perpendicular to said width dimension.

In a second aspect of the fourth embodiment, with the top and bottom surfaces of the knife establishing a width dimension therebetween, the knife body and insert together may satisfy one of the following two conditions: (1) the front side of the insert has a cavity defining a bottoming surface situated between two spaced-apart walls projecting forwardly away from the bottoming surface and toward the knife body, and the rear side of the knife body has a reduced-width portion projecting rearwardly toward the insert, the cavity adapted to receive the reduced-width portion of the knife body between the walls such that selected other portions of the knife body rest against respective ends of the walls with the reduced-width portion being spaced apart from the bottoming surface; and (2) the rear side of the knife body has a cavity defining a bottoming surface situated between two spaced-apart walls projecting rearwardly away from the bottoming surface and toward the insert, and the front side of the insert has a reduced-width portion projecting forwardly toward the knife body, the cavity adapted to receive the reduced-width portion of the insert between the walls such that selected other portions of the insert rest against respective ends of the walls with the reduced-width portion being spaced apart from the bottoming surface.

In a first variation of the second aspect of the fourth embodiment, the knife body may have a body mounting hole establishing a body mounting hole axis, and in an assembled configuration of the knife in which the insert is operatively attached to the knife body, the body mounting hole axis may intersect the insert through the bottoming surface under condition (1), or through the reduced-width portion under condition (2).

In combination with the first variation of the second aspect of the fourth embodiment, a threaded fastener may be provided for extending through the body mounting hole and making contact with either the bottoming surface under condition (1), or the reduced-width portion under condition (2).

In combination with the first variation of the second aspect of the fourth embodiment, regardless of what, if anything, the knife body mounting hole axis intersects, and regardless whether the threaded fastener is provided or not, under condition (1) the width of the reduced-width portion may generally decrease in the direction of increasing proximity to the bottoming surface; it may steadily decrease and define an angle of taper; and the walls of the cavity may have side surfaces facing the reduced-width portion defining an included angle therebetween that equals or exceeds the angle of taper, and under condition (2) the width of the reduced-width portion may generally increase in the direction of increasing proximity to the bottoming surface; it may steadily increase and define an angle of reverse taper; and the walls of the cavity may have side surfaces facing the reduced-width portion defining an included angle therebetween that equals or exceeds the angle of reverse taper.

In combination with the first variation of the second aspect of the fourth embodiment, regardless what, if anything, the knife body mounting hole axis intersects, regardless whether the threaded fastener is provided or not, and regardless whether or how the width of the reduced-width portion changes with increasing proximity to the bottoming surface, the insert mounting hole may be threaded, in the assembled configuration of the knife the insert mounting hole axis may be aligned with the body mounting hole axis, and the insert and knife body may be cooperatively adapted so that, with the threaded fastener being threadably received in the insert mounting hole, advancing the threaded fastener through the body mounting hole toward the insert tends to draw the insert toward the knife body.

In addition, the insert mounting hole may be blind.

Alternatively, under condition (2), the body mounting hole may be threaded, and the insert and knife body may be cooperatively adapted so that advancing the threaded fastener through the body mounting hole toward the insert exerts a force on the insert tending to push the insert away from the knife body, and so that said force is equally opposed by internal stress developed in the insert and knife body as a result of interference between selected surfaces thereof.

In addition, there may be no mounting hole in the insert.

In a fifth embodiment, with the top and bottom surfaces of the knife establishing a width dimension therebetween, the knife body and insert together satisfy one of the following two conditions: (1) the front side of the insert has a cavity defining a bottoming surface situated between two spaced-apart walls projecting forwardly away from the bottoming surface and toward the knife body, and the rear side of the knife body has a reduced-width portion projecting rearwardly toward the insert; and (2) the rear side of the knife body has a cavity defining a bottoming surface situated between two spaced-apart walls projecting rearwardly away from the bottoming surface and toward the insert, and the front side of the insert has a reduced-width portion projecting forwardly toward the knife body, wherein, under either condition (1) or (2), the cavity is adapted to receive the reduced-width portion between the walls.

In combination with the fifth embodiment, the width of the reduced-width portion may generally decrease in the direction of increasing proximity to the bottoming surface; it may steadily decrease and define an angle of taper; and the walls of the cavity may have side surfaces facing the reduced-width portion defining an included angle therebetween that equals or exceeds the angle of taper.

In addition, the knife body may have a body mounting hole therethrough establishing a body mounting hole axis, and the insert may have a threaded insert mounting hole therein establishing an insert mounting hole axis wherein, in an assembled configuration of the knife, the body and insert mounting hole axes are aligned.

The insert mounting hole may be blind.

In alternative combination with the fifth embodiment, the width of the reduced-width portion may generally increase in the direction of increasing proximity to the bottoming surface; it may steadily increase and define an angle of reverse taper; and the walls of the cavity may have side surfaces facing the reduced-width portion defining an included angle therebetween that equals or exceeds the angle of reverse taper.

In addition, there may be no mounting hole in either the knife body or the insert; and alternatively, there may be a threaded mounting hole in the knife body.

In a sixth embodiment, the knife has a knife body having front and rear sides, and at least one insert for removable attachment to the knife body, the at least one insert also having front and rear sides. The knife and insert together satisfy one of two conditions: (1) the front side of the knife body has a cutting edge, the front side of the insert is removably mounted to the rear side of the knife body, and either (A) the rear side of the insert has a cutting edge, or (B) the rear side of the insert has a blunt face that forms a rear side of the knife; or (2) the rear side of the knife body has a blunt face that forms the rear side of the knife, the rear side of the insert is removably mounted to the front side of the knife body, and the front side of the insert has a cutting edge.

In a more specific form of the sixth embodiment, under condition (1) the front side of the knife body has a cutting edge and defines an acute cutting angle, the knife body and insert are cooperatively adapted for mounting the front side of the insert to the rear side of the knife body, and either (A) the rear side of the insert has a cutting edge and establishes an acute cutting angle, or (B) the rear side of the insert has a blunt face suitable for indexing the knife that, when the insert is mounted to the knife body so as to form an operative, assembled configuration of the knife, forms the rear side of the knife; and under condition (2) the rear side of the knife body has a blunt face suitable for indexing the knife that, when the insert is mounted to the knife body so as to form an operative, assembled configuration of the knife, forms the rear side of the knife, the knife body and insert are cooperatively adapted for mounting the rear side of the insert to the front side of the knife body, and the front side of the insert has a cutting edge and establishes an acute cutting angle.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

FIG. 7 is a schematized, side elevation of the knife of FIG. 6 installed in the knife assembly of FIG. 2.

FIG. 8 is a side elevation of a preferred knife according to the invention, with a knife body portion providing double-walled support between a cutting edge insert portion and the knife body portion, with the walls being provided as part of the knife body portion.

FIG. 9 is an enlarged side elevation of the knife of FIG. 8, showing particularly the interface between the cutting edge insert and knife body portions.

FIG. 10 is an enlarged side elevation corresponding to FIG. 9, with the interface between the cutting edge insert and knife body portions exhibiting a taper according to the invention.

FIG. 11 is a side elevation corresponding to that of FIG. 10 representing a first exemplary alternative form of taper according to the invention.

FIG. 12 is a side elevation corresponding to that of FIG. 10 representing a second exemplary alternative form of taper according to the invention.

FIG. 13 is a side elevation corresponding to that of FIG. 10 representing a third exemplary alternative form of taper according to the invention.

FIG. 14 is a side elevation corresponding to that of FIG. 10 representing a fourth exemplary alternative form of taper according to the invention.

FIG. 15 is a side elevation corresponding to that of FIG. 10 representing a fifth exemplary alternative form of taper according to the invention.

FIG. 16 is a side elevation of a knife according to the invention having the cutting edge insert portion of the knife of FIG. 8 with an alternative knife body portion according to the invention.

FIG. 17 is a side elevation of a knife according to the invention, with a knife body portion providing double-walled support between a cutting edge insert portion and the knife body portion, with the walls being provided as part of the cutting edge insert portion.

FIG. 18 is a side elevation of a knife according to the invention having the cutting edge insert portion of the knife of FIG. 17 with an alternative knife body portion according to the invention.

FIG. 19 is an enlarged side elevation corresponding to FIG. 18, but showing the interface between the cutting edge insert and knife body portions exhibiting a taper according to the invention.

FIG. 20 is a bottom plan view of a knife according to the invention with a knife body portion providing single-walled support between a cutting edge insert portion and the knife body portion, with the wall provided as part of the knife body portion.

FIG. 21 is a cross-sectional view of the knife of FIG. 20, taken along a line 21-21 thereof.

FIG. 22 is a cross-sectional view of a knife according to the invention for comparison with FIG. 21, representing an alternative to the knife of FIG. 21 where the wall is provided as part of the cutting edge insert portion instead of part of the knife body portion.

FIG. 23 is a cross-sectional view of the knife of FIG. 20, taken along a line 23-23 thereof.

FIG. 24 is a side elevation of a knife according to the invention for comparison with FIG. 21, representing an alternative to the knife of FIG. 21 having an extended wall.

FIG. 25 is a side elevation of knife according to the invention, with a knife body portion providing double-walled support between a cutting edge insert portion and the knife body portion, with the walls being provided as part of the knife body portion, and with the interface between the cutting edge insert and knife body portions exhibiting a reverse taper according to the invention.

FIG. 26 is a side elevation of knife according to the invention, with a knife body portion providing double-walled support between a cutting edge insert portion and the knife body portion, with the walls being provided as part of the cutting edge insert portion, and with the interface between the cutting edge insert and knife body portions exhibiting a reverse taper according to the invention.

FIG. 27 is a side elevation of a knife according to the invention having a first alternative configuration to that of FIG. 25.

FIG. 28 is a side elevation of a knife according to the invention having a second alternative configuration to that of FIG. 25.

DETAILED DESCRIPTION OF PREFERRED EMBODIMENTS

Figure 1:
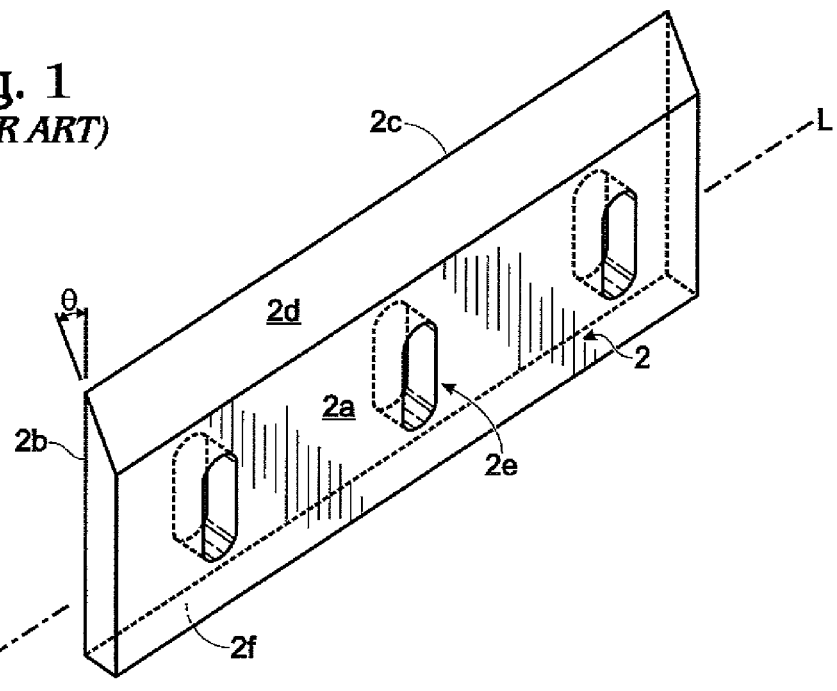
FIG. 1 is an isometric view of a prior art single-sided knife.

For reference, FIG. 1 shows a prior art knife 2 for use in industrial wood processing machines. The knife 2 is formed of solid steel. It is elongate in directions parallel to the axis indicated as "L" and has a top surface 2a, a bottom surface 2b, a cutting edge 2c, and a knife-edge-joining surface 2d that defines an acute cutting angle θ relative to the bottom surface 2b. The knife 2 also has holes 2e used for mounting the knife to a rotating cutting head (not shown) of the wood processing apparatus, and a rear surface 2f.

The rear surface 2f of the knife 2 is used for indexing the knife to the cutting head, by butting the rear surface 2f against a back-stop on the cutting head. Precise indexing of the knife is important when the knife is used in industrial wood processing applications such as in a sawmill, where the cutting fores are large and control of the chip size is important. Because the rear surface 2f is used for indexing the knife, it is not available for use as a cutting edge, and so knives like the knife 2, that are bolted directly to the cutting head, and that are used in industrial wood processing applications where either the cutting forces are large or control of chip size is important, are single sided.

Figure 2:
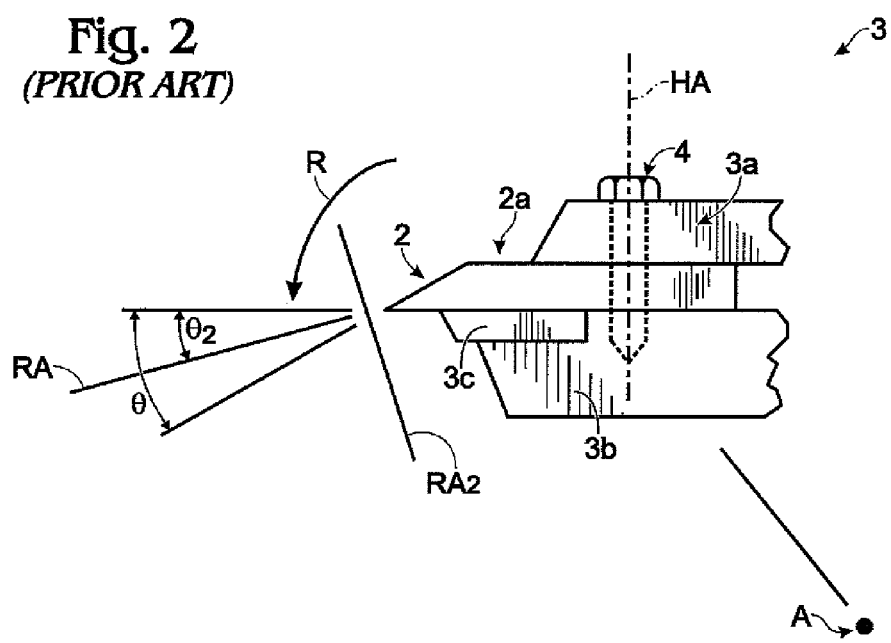
FIG. 2 is a schematized, elevation view of the knife of FIG. 1 installed in a knife assembly according to prior art practice.

Turning to FIG. 2, the knife 2 can also be part of a knife assembly 3 having an upper or outer clamping member 3a and a lower or inner clamping member 3b. A clamp bolt 4 extends through a hole through the upper clamping member 3a, through one of the slots 2e of the knife 2, and into a threaded hole in the lower clamping member 3b. The lower clamping member 3b is, in turn, bolted to the cutting head.

Often a replaceable wear insert 3c is provided in the lower clamping member 3b. For reference, either the lower clamping member 3b or the wear insert may be referred to as a counterknife, and the lower clamping member 3b may also be referred to as a base.

The top surface 2a of the knife makes contact with the upper clamping member 3a, and the bottom surface 2b of the knife makes contact with either or both the lower clamping member 3b and the wear insert 3c.

When the clamp bolt 4 is tightened, the knife 2 is held firmly between the two clamping members 3a, 3b by compression, the clamping members providing significant structural support for the knife, allowing it to be of significantly smaller dimensions.

The lower clamping member 3b is attached to a hub (not shown) that is commonly provided in a circular, cylindrical, or conical configuration, for rotating the lower clamping member 3b, and thus the knife 2 clamped thereto, around an axis "A" that is parallel to the axis "L" in FIG. 1. Particularly, the knife is rotated about the axis A in the direction indicated as "R." Thus the bottom surface 2b of the knife faces the direction of knife rotation. Representative examples of such apparatus are disclosed in U.S. Pat. Nos. 3,542,302, 4,456, 045, and 5,005,620.

Figure 3:
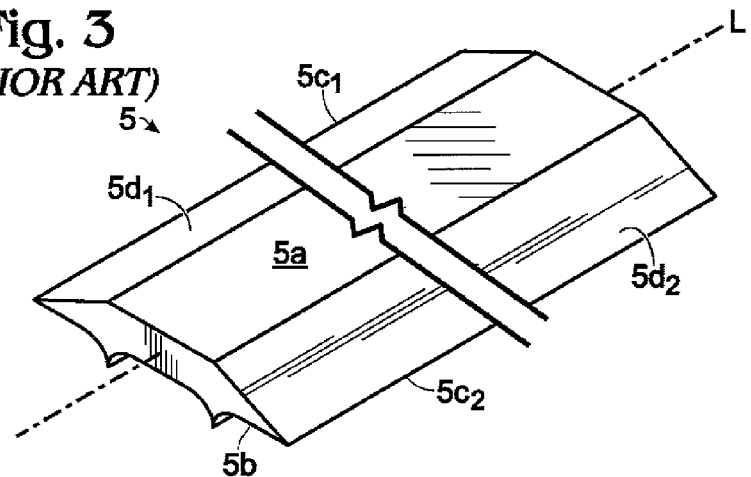
FIG. 3 is a top, perspective view of a prior art double-sided knife.

FIG. 3 shows an alternative, prior art double-sided knife 5, having a top surface 5a, a bottom surface 5b, two cutting edges $5c_1$ and $5c_2$, and two corresponding knife-edge-joining surfaces $5d_1$ and $5d_2$ that typically define equal acute cutting angles θ relative to the bottom surface 5b.

Figure 4:
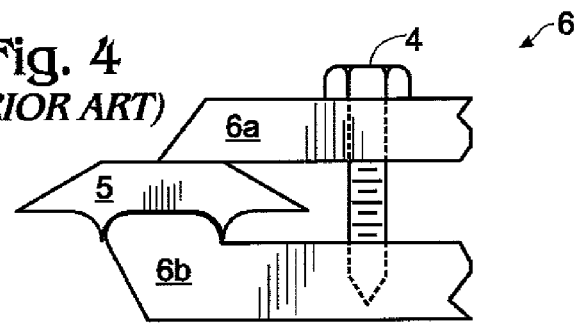
FIG. 4 is a schematized, elevation view of the knife of FIG. 3 installed in a knife assembly according to prior art practice.

FIG. 4 shows the knife 5 installed in a knife assembly 6 including an upper clamping member 6a and a lower clamping member 6b. The knife 5 is clamped between the two clamping members 6a, 6b in the same way and with the same clamping bolt 4 utilized in the embodiment depicted in FIG. 2.

Since the knife 5 is double-sided, it does not have an equivalent to the side 2f of the knife 2 for indexing. Instead, the knife 5 typically has one or more knife indexing features on the bottom surface 5b, which may be either projections or depressions, for mating with corresponding (inverse) features in the lower clamping member. In the depicted embodiment, the knife indexing features are known in the art as "deflector ridges," which are symmetrical, spaced apart projections that each terminate in a single linear edge. Because of the indexing features, there is no need for the knife 5 to have a slot like the slots 2e of the knife 2 to provide for fore/aft adjustment. All that is required is a round hole, which can have a diameter that makes a snug fit with the clamping bolt 4.

The cutting edges 2c of the knife 2 and $5c_1$ and $5c_2$ of the knife 5 wear during use, and eventually the knife must be removed from the apparatus so that the knife can be either sharpened or replaced. The knife is sharpened by removing metal from the knife-edge-joining surface(s), which results in a recession of the cutting edge(s). The slotted configuration of the holes 2e of the knife 2 allows the knife 2 to be repositioned farther forward in the apparatus to compensate for the recession of the knife edge.

The knife 5, on the other hand, cannot be repositioned, and so a user of the knife 5 has a much more limited ability to sharpen it. This limitation is consistent with the objective of having the knife be disposable, but in many circumstances this is not truly cost effective.

Improvements according to the invention are provided for both types of knives 2 and 5, as will next be described in connection with the knife 2 for ease of discussion, it being understood that the same principles would apply to the knife 5.

Figure 5:
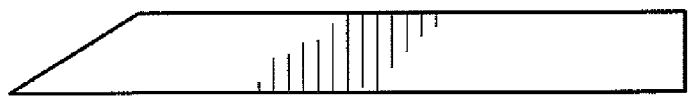
FIG. 5 is a side elevation of the knife of FIG. 1.
Figure 6:
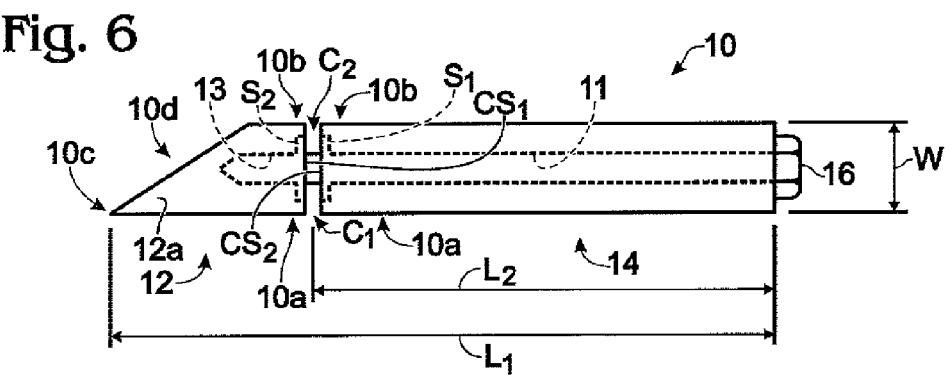
FIG. 6 is a side elevation of a generalized knife according to the invention, having a cutting edge insert portion and a knife body portion.

FIG. 5 shows the knife 2 in profile (perpendicular to the axis L), for comparison with a knife 10 according to principles of the invention, shown in FIG. 6. The knife 10 is, like the knife 2, elongate and likewise defines an elongate axis L (not discernible in FIG. 6) equivalent to that shown in FIG. 1.

Knives according to the invention are typically used to cut logs or lumber, but they can be used to cut any material, such as plastic or waste material, and they can be used in lighter duty applications.

The knife 10 has a top surface 10a, a bottom surface 10b, and a cutting edge 10c. The top surface 10a includes, near the cutting edge 10c, a cutting-edge-joining surface 10d that defines an acute cutting angle θ relative to the bottom surface 10b. The angle θ can be in the range 15-85 degrees, but it is typically and preferably in the range 20-45 degrees.

Unlike either of the aforedescribed knives 2 and 5, the knife 10 is formed of two separate parts, a cutting edge insert portion 12 and a knife body portion 14 to which the which the cutting edge insert portion is removably mounted. The two parts are drawn, or pulled, tightly together by one or more bolts 16 extending through corresponding holes 11 through the body portion 14, each bolt 16 having a threaded end received in a correspondingly threaded, and preferably blind, mounting hole 13 in the cutting edge insert portion 12. Herein, the one or more bolts will often be referred to as a single bolt for convenience, it being understood that there are typically a number of identical bolts, spaced apart along the axis corresponding to L in FIG. 1.

The bolt 16 when tightened forces the cutting edge insert portion 12 against the knife body portion 14 along an interface defined along the surfaces indicated in solid lines as "$CS_1$" (of the knife body portion 14) and "$CS_2$" (of the cutting edge insert portion 12). The surfaces $CS_1$ and $CS_2$ are "contacting surfaces" against which contact is made between the knife body portion 14 and the cutting edge insert portion 12.

The cutting edge insert portion 12 has its own body 12a which includes the cutting edge 10c of the knife, and portions of the top and bottom surfaces of the knife in the vicinity of the cutting edge. The cutting edge insert body 12a preferably includes the entirety of the cutting-edge-joining surface 10, but may include only a portion thereof. The cutting edge insert body 12a is preferably monolithic and forms the entirety of the cutting edge insert portion, but neither of these conditions is essential. In the description to follow, it will be assumed that the cutting edge insert body 12a is monolithic and forms the entirety of the cutting edge insert portion 12, and it will be referred to as a cutting edge insert portion of the knife of which it is a part.

FIG. 7 shows a portion of the cutting apparatus of FIG. 2 with the knife 10 installed therein, in place of the knife 2. A force "F" is applied to the knife 10 at an outer end 15 thereof. The force F represents the typical force exerted on the knife 10 as a result of the knife coming into contact with a log, or any other material or matter which the cutting apparatus is being used to cut, as the knife is rotated down upon the log in the direction indicated in FIG. 2. This subjects the end 15 to a bending moment about the point "B."

The bolt 16 is tightened sufficiently to draw, or pull, the cutting edge insert portion 12 against the knife body portion 14 so that separation of the two parts does not occur at point "$C_1$," when the knife is loaded by the force F. Thus, the knife body and cutting edge insert portions are held against each other by a compressive force resulting from a tensile force sustained by the bolt.

The bolt 16 need not have a large diameter to sustain the required tensile force. Also, very little contacting surface area is required to sustain the resulting compressive force between the cutting edge insert and knife body portions, and it is desirable to minimize the contacting surface area to increase the compressive stress holding the two portions together. For example, referring back to FIG. 6, the amount of the interface between the cutting edge insert portion 12 and the knife body portion 14 that makes contact can be minimized by relieving either or both of the surfaces $CS_1$ and $CS_2$ over the areas indicated in dotted lines as "$S_1$" and "$S_2$," to concentrate the compressive force over the surface areas close to the points $C_1$ and $C_2$.

FIG. 8 shows a first preferred embodiment 20 of a knife according to the invention. The knife 20 has a cutting edge insert portion 22 having a cutting edge 22c (which is linear and is oriented perpendicular to the plane of the Figure and therefore shows as a point), and a knife body portion 24. As for the knife 10 of FIG. 6, one or more bolts 16 extend through respective mounting holes 21a in the knife body portion, which are typically un-threaded, and into corresponding threaded mounting holes 21b in the cutting edge insert portion, each bolt defining a bolt axis "BA." As in the knife 10 of FIG. 6, the bolt is employed for drawing the two portions together, so that each is placed into compression against the other at a contacting interface therebetween to form an operative, assembled configuration of the knife 20.

The cutting edge insert and knife body portions 22, 24 of the knife 20 provide the advantage, relative to the knife 10, of an interlocking contacting interface that, by virtue of geometry alone, is able to resist separation of the two portions in response to forces "F" which may be applied in either of the two directions indicated.

Particularly in this embodiment, the knife body portion has a cavity 23 therein, the cavity having spaced-apart walls 25a and 25b separated by a "bottoming" surface 27a. The meaning of the term "bottoming" will become clear in context, but it may be noted at the outset that the term as used herein refers to depth (of the cavity), and is not intended to signify orientation. The walls 25a, 25b extend away from the bottoming surface, toward the cutting edge insert portion, i.e., toward the FRONT side of the knife when the knife is in the operative, assembled configuration.

The reduced-width portion 29 of the cutting edge insert portion is preferably snugly received between the walls 25a, 25b. Thus the wall 25a, by virtue of its interference with a BOTTOM side of the reduced-width portion 29, resists relative movement between the cutting edge insert and knife body portions 22, 24 in response to a force F directed towards the right in FIG. 8; and the wall 25b, by virtue of its interference with a TOP side of the reduced-width portion 29, resists relative movement between the cutting edge insert and knife body portions in response to a force F directed towards the left in FIG. 8.

The reduced-width portion 29 is received between the walls 25a, 25b so that remaining portions, indicated at "$C_3$" and "$C_4$" of the cutting edge insert portion seat or rest on corresponding portions of the knife body portion such that a REAR surface 27b of the reduced-width portion remains spaced apart a non-zero separation distance "$D_1$" from the bottoming surface 27a. Thus in addition to snugly receiving TOP and BOTTOM sides of the reduced-width portion, the walls 25a, 25b also function as stand-offs.

Apart from providing for a non-zero separation distance $D_1$, it is preferable to otherwise minimize $D_1$, and maximize the length of the reduced-width portion 29 of the cutting edge insert portion 22, and therefore the depth of the cavity in the knife body portion 24, to maximize the lateral stability of the cutting edge insert portion in the cavity.

Referring to FIG. 9, the interface between the cutting edge insert portion 22 and the knife body portion 24 is defined by all of the surfaces shown as $26a_1$, $26b_1$; $26a_2$, $26b_2$; $28a_1$, $28a_2$; $28b_1$, $28b_2$; and 27a, 27b, with the surfaces $26a_1$, $26a_2$, $28a_2$, $28b_2$, and 27b being surfaces of the cutting edge insert portion 22, and the surfaces $26b_1$, $26b_2$, $28a_1$, $28b_1$, and 27a being surfaces of the knife body portion 24. The surfaces fall into three general categories: (1) the surfaces $26a_1$, $26b_1$, $26a_2$ and $26b_2$, referenced generally as being in the vicinity of the reference designators "$C_3$" and "$C_a$" are contacting surfaces for sustaining concentrated compressive stress; (2) the surfaces $28a_1$, $28a_2$, $28b_1$ and $28b_2$ may be contacting surfaces but do not sustain significant stress and provide instead for lateral stability of the cutting edge insert portion relative to the knife body portion; and (3) the surfaces 27a and 27b are, in most embodiments, non-contacting surfaces that provide for relief and therefore stress enhancement at the contacting surfaces.

It will be understood that the same principles of definition apply for all embodiments. Generally, the interface between the cutting edge insert and knife body portions can be recognized as being all the surface portions disposed between the two portions, i.e., all the surfaces of the two portions that confront one another, when the two portions are mounted together to form an operative, assembled configuration of the knife.

It will also be understood that, while it is preferable to provide all three categories of surfaces, only the first category (1) is essential, and surfaces of this category may be combined with surfaces of either or both of the remaining categories (2), (3).

FIG. 10 shows a preferred improvement to the interface shown for the knife 20 of FIG. 9, in which a knife 20a has a knife body portion 24a having a cavity 23a with walls 25c, 25d; and a cutting edge insert portion 22b having a reduced-width portion 29a. TOP and BOTTOM sides of the reduced-width portion, as well as corresponding TOP and BOTTOM inside surfaces 28a, 28b of the walls 25c, 25d are sloped, preferably with equal angles $\phi_{1,1,a}$ (slope of reduced-width portion 29a, TOP side) $\phi_{1,2,a}$ (slope of BOTTOM facing side of wall 25d), $\phi_{2,1,a}$ (slope of reduced-width portion 29a, BOTTOM side) and $\phi_{2,2,a}$ (slope of TOP facing side of wall 25c); however, the angles $\phi_{1,1,a}$ and $\phi_{2,1,a}$ can be greater than, respectively, the angles $\phi_{1,2,a}$ and $\phi_{2,2,a}$, and the angles $\phi_{1,1,a}$ and $\phi_{1,2,a}$ need not be equal to, respectively, the angles $\phi_{2,1,a}$ and $\phi_{2,2,a}$ (the slopes can be asymmetric from TOP to BOTTOM).

The aforedescribed slopes result in a "taper," which is arbitrarily defined for purposes herein by an angle $T_1$ of taper, which is the included angle between the sloped TOP and BOTTOM sides of the reduced-width portion 29a. There is also a corresponding included angle $T_2$ for the cavity having a magnitude that equals or exceeds the angle of taper, so that the reduced-width portion fits within the cavity. The angle of taper is typically in the range 1-5 degrees, more preferably 1-3 degrees, and most preferably 1-2 degrees.

The TOP and BOTTOM surfaces of the knife establish a width dimension "W" therebetween. With reference to this dimension, taper implies that the width of the reduced-width portion decreases with increasing proximity to the bottoming surface. Therefore, in FIG. 10 where the reduced-width portion is part of the cutting edge insert portion, taper implies that the width of the reduced-width portion decreases in the direction toward the knife body portion.

Preferably, the width of the reduced-width portion increases or decreases, e.g., the TOP and BOTTOM sides of the reduced-width portion 29a, and the corresponding TOP and BOTTOM inside surfaces 28a, 28b of the walls 25c, 25d, show as straight lines in elevation as indicated in FIG. 10, and therefore have constant slopes. However, this is not essential. Some alternatives are shown in FIGS. 11-15, it being understood that there are numerous other possibilities. These alternatives are shown with taper, in the manner of the embodiment of FIG. 10, but may also be provided with zero taper, in the manner of the embodiment of FIG. 9, or reverse taper, in the manner of the embodiment of FIG. 26 (discussed below).

Referring back to FIGS. 8 and 9, as a general principle there is a minimum diameter for the bolt 16, and therefore a minimum diameter for the mounting hole (referenced as 21 in FIG. 9) in the cutting edge insert portion 22, so that the bolt will be able to sustain the tensile stress required to maintain contact between the cutting edge insert portion 22 and the knife body portion 24 over the surfaces $26a_1$ and $26b_1$, and $26a_2$ and $26b_2$, when the anticipated forces F are being applied to the cutting edge insert portion of the knife. These diameters will determine a minimum width for the reduced-width portion 29 to prevent "break-out" of the bolt, which will depend on the strength of the metal of which the cutting edge insert portion 22, and more particularly the reduced-width portion 29, is formed, preferably hardened tool steel. The thicknesses (measured TOP to BOTTOM) of the walls 25a, 25b will then generally be determined as being the remainder of the available width "W," minus a slight tolerance for fitting the reduced-width portion 29 into the cavity 23 without undue interference. That is, a snug fit over the surfaces $28a_1$ and $28a_2$, and $28b_1$ and $28b_2$, is helpful to improve lateral stability of the cutting edge insert portion within the cavity of the knife body portion, but the fit should not be so snug that the cutting edge insert portion cannot be knocked out of the knife body portion with relative ease by personnel involved in knife repair or replacement.

FIG. 16 shows a knife 30 that represents a variation of the knife 20 of FIG. 8. Here, a shorter bolt 26 is utilized, and access to the head of the bolt is obtained through a hole 28 through the knife body portion that is similar to the holes 2e shown in FIG. 1. Preferably, the bolt 26 has an Allen type recess in the head for access with a tool 31 allowing for off-axis tightening and loosening.

FIG. 17 shows a knife 40 according to the invention that is essentially the inverse of the configuration of the knife 20 of FIG. 6, and FIG. 18 shows a knife 50 that is to the knife 40 of FIG. 17 as the knife 30 of FIG. 16 is to the knife 20 of FIG. 8.

The knife 40 has a knife body portion 44 having a reduced-width portion 49, and a cutting edge insert portion 42 having a cavity 43 defined by two spaced-apart walls 45a, 45b separated by a bottoming surface 47a. The reduced-width portion 49 is received between the walls 45a, 45b so that remaining portions in the vicinity of reference designators "$C_5$" and "$C_6$" of the cutting edge insert portion (corresponding to the surfaces $26a_1$ and $26a_2$ in FIG. 9) seat or rest on corresponding portions of the knife body portion (corresponding to the surfaces $26b_1$ and $26b_2$ in FIG. 9) such that a FRONT surface 47b of the reduced-width portion is spaced apart from the bottoming surface 47a.

FIG. 19 shows a variation 40a of the knife 40 having a preferred tapered interface analogous to that of FIG. 10. The knife 40a, has a cutting edge insert portion 42a having a cavity 43a with walls 45c, 45d; and a knife body portion 44a having a reduced-width portion 49a. TOP and BOTTOM sides of the reduced-width portion, as well as corresponding TOP and BOTTOM inside surfaces 48a, 48b of the walls 45c, 45d are sloped, preferably with equal angles $\phi_{1,1,b}$ (slope of reduced-width portion 49a, TOP side) $\phi_{1,2,b}$ (slope of BOTTOM facing side of wall 45d), $\phi_{2,1,b}$ (slope of reduced-width portion 49a, BOTTOM side) and $\phi_{2,2,b}$ (slope of TOP facing side of wall 45c); however, the angles $\phi_{1,1,b}$ and $\phi_{2,1,b}$ can be greater than, respectively, the angles $\phi_{1,2,b}$ and $\phi_{2,2,b}$, and the angles $\phi_{1,1,b}$ and $\phi_{1,2,b}$ need not be equal to, respectively, the angles $\phi_{2,1,b}$ and $\phi_{2,2,b}$ (the slopes can be asymmetric from TOP to BOTTOM). The aforedescribed slopes define an angle $T_1$ of taper, and there is also a corresponding included angle $T_2$ for the cavity having a magnitude that equals or exceeds the angle $T_1$ so that the reduced-width portion fits within the cavity.

As for the knife 20a of FIG. 10, the angle of taper for the knife 40a is typically in the range 1-5 degrees, more preferably 1-3 degrees, and most preferably 1-2 degrees; that is, the angle of taper is preferably the same regardless of which of the cutting edge insert and knife body carries the reduced-width portion. In general, it will be understood that taper is preferably provided in all embodiments providing for double-walled support between the cutting edge insert and knife body portions, and the preferred degrees of taper are the same for all knives unless otherwise indicated.

Again with reference to the width dimension "W" of the knife, and where, as in the knife 40a, the reduced-width portion is part of the knife body portion, taper implies that the width of the reduced-width portion increases in the direction toward the cutting edge insert portion.

Returning to FIG. 18, as is the case for all the embodiments, there are in general forces directed to both the bottom and the top sides of the knife, referenced as "$F_{BOTTOM}$" and "$F_{TOP}$" respectively. The force $F_{BOTTOM}$ tends to unload the interface between the cutting edge insert portion (here referenced as 52) and the knife body portion (here referenced as 54) at $C_5$ whereas the force $F_{TOP}$ tends to unload the interface at $C_6$. Thus it is generally important that the interface at both of these points is kept under compression.

However, it may be that there is significant loading from only one direction, i.e., $F_{BOTTOM}$ is significantly greater than $F_{TOP}$, or $F_{TOP}$ may be substantially zero. In such case, it may only be necessary to provide for compression at just one of the locations $C_5$ and $C_6$.

An example is shown in FIGS. 20 and 21, referring to a knife 60 according to the invention. Referring particularly to FIG. 21, the cutting edge insert portion 62 rests against a single wall 65 of the knife body portion 64a, which is drawn in an abbreviated form for increased generality. The bolt 66a draws the cutting edge insert portion against the end of the wall 65, to place it under compression at the location "$C_7$." The knife 60 is a single-walled analogue of the double-walled embodiments of FIGS. 8 and 16, where the reduced-width portion is part of the knife body portion.

Illustrating a broader applicability of the same principle, FIG. 22 shows a knife 67 having a cutting edge insert portion 68 and a knife body portion 69. The knife 67 is a single-walled analogue to the double-walled embodiments of FIGS. 17 and 18, where the reduced-width portion is part of the cutting edge insert portion.

FIG. 23 shows an optional adaptation of the knife 60 for supporting a load $F_{TOP}$, with the knife body portion 64a adapted to receive additional bolts 66b. As best seen in FIG. 15, the bolts 66a (FIG. 19) and 66b (FIG. 20) are preferably staggered along the elongate axis L.

FIG. 24 shows a knife 70 which is a variation of the knife 60. The knife 70 has a cutting edge insert portion 72 and a knife body portion 74 with a wall 75 which is a longer version of the wall 65 of the knife 60. The knife 70 supports the load $F_{TOP}$ by the leverage obtained from mounting the bolt 76 far from where the load $F_{TOP}$ is applied.

Like the knife 60, the knife 70 is an analogue of the double-walled embodiments of FIGS. 8 and 16, it being understood that analogues to the double-walled embodiments of FIGS. 17 and 18 may also be provided according to the same principle.

It will be noted that in the embodiments of FIGS. 20-24 the cutting edge insert and knife body portions do not interlock in the same manner described above. Rather, the assumption here is that there is significant loading from only one direction; thus, interlocking need only be effective in one direction, i.e., separation of the cutting edge insert portion and the knife body portions need only be resisted in response to forces F applied in one of the two directions indicated in FIG. 8. Thus for example, walls 65 and 75 of the knives 69 and 70, by virtue of their interference with a BOTTOM side of respective reduced-width portions 63 and 73 of the corresponding cutting edge insert portions 62 and 72, only significantly resist relative movement between the cutting edge insert and knife body portions in response to a force F directed towards the left (arrow, FIG. 21); since there is no significant force being directed in the opposite direction, no further provision for resisting relative movement between the cutting edge insert and knife body portions is needed.

However, it is preferred in the single-walled embodiments to employ interlocking features, in the sense of resisting forces in either the TOP or BOTTOM direction, between the ends of the walls and the opposed knife portion seated thereon. So for example in the knife 70 of FIG. 24, the cutting edge insert portion 72 may have a concavity for receiving a mating, rounded tip of the wall 75 at "$C_8$," and in the knife 67 of FIG. 23, similar complementary interlocking features may be provided at the area of rest between the wall 65 and the knife body portion 68. Reverse variations of such features could likewise be provided, i.e., instead of a projection at the end of the wall being received in a complementary depression in the opposed knife portion, a projection from the opposed knife portion may be received in a complementary depression in the end of the wall.

FIG. 25 shows a knife 80, analogous to the knives 20 and 30, but having a reverse taper according to the invention. The knife 80 has a cutting edge insert portion 82 and a knife body portion 84. A bolt 16 extends through a typically un-threaded mounting hole 81a in the knife body portion, and into a corresponding threaded mounting hole 81b in the cutting edge insert portion. The bolt is employed for drawing the two portions together so that they mate at a contacting interface to form an operative, assembled configuration of the knife 80.

The cutting edge insert portion 82 has a reduced-width portion 89; and the knife body portion has a cavity 83 defined by spaced apart walls 85a, 85b separated by a bottoming surface 87a. TOP and BOTTOM sides of the reduced-width portion, as well as corresponding TOP and BOTTOM inside surfaces 88a, 88b of the walls 85c, 85d are sloped, preferably with equal angles $\phi r_{1,1,a}$ (slope of reduced-width portion 89, TOP side) $\phi r_{1,2,a}$ (slope of BOTTOM facing side of wall 85d), $\phi r_{2,1,a}$ (slope of reduced-width portion 89, BOTTOM side) and $\phi r_{2,2,a}$ (slope of TOP facing side of wall 85c) however, the angles $\phi r_{1,2,a}$ and $\phi_{2,2,a}$ can be greater than, respectively, the angles $\phi r_{1,1,a}$ and $\phi r_{2,1,a}$, and the angles $\phi r_{1,1,a}$ and $\phi_{1,2,a}$ need not be equal to, respectively, the angles $\phi r_{2,1,a}$ and $\phi r_{2,2,a}$ (the slopes can be asymmetric from TOP to BOTTOM).

The aforedescribed slopes result in a "reverse taper," which is arbitrarily defined for purposes herein by an angle $Tr_1$ of reverse taper, which is the included angle between the sloped TOP and BOTTOM sides of the reduced-width portion 89. There is also a corresponding included angle $Tr_2$ for the cavity having a magnitude that equals or exceeds the angle $Tr_1$, so that the reduced-width portion fits within the cavity. The angle of reverse taper is typically in the range 1-5 degrees, more preferably 1-3 degrees, and most preferably 1-2 degrees.

The TOP and BOTTOM surfaces of the knife establish a width dimension "W" therebetween. With reference to this dimension, reverse taper implies that the width of the reduced-width portion decreases with increasing proximity to the bottoming surface. So where, as in FIG. 25, the reduced-width portion is part of the cutting edge insert portion, reverse taper implies that the width of the reduced-width portion increases in the direction toward the knife body portion.

FIG. 26 shows a knife 180 having an alternative reverse taper configuration, which is to the knife 80 of FIG. 25 as the knife 40 of FIG. 17 is to the knife 20 of FIG. 8. The knife 180, has a cutting edge insert portion 182 having a cavity 183 with walls 185c, 185d; and a knife body portion 184 having a reduced-width portion 189. TOP and BOTTOM sides of the reduced-width portion, as well as corresponding TOP and BOTTOM inside surfaces 188a, 188b of the walls 185c, 185d are sloped, preferably with equal angles $\phi r_{1,1,b}$ (slope of reduced-width portion 189, TOP side) $\phi r_{1,2,b}$ (slope of BOTTOM facing side of wall 185d), $\phi r_{2,1,b}$ (slope of reduced-width portion 189, BOTTOM side) and $\phi r_{2,2,b}$ (slope of TOP facing side of wall 185c); however, the angles $\phi r_{1,2,b}$ and $\phi r_{2,2,b}$ can be greater than, respectively, the angles $\phi r_{1,1,b}$ and $\phi_{2,1,b}$, and the angles $\phi r_{1,1,b}$ and $\phi r_{1,2,b}$ need not be equal to, respectively, the angles $\phi r_{2,1,b}$ and $\phi r_{2,2,b}$ (the slopes can be asymmetric from TOP to BOTTOM). The aforedescribed slopes define an angle $Tr_1$ of reverse taper, and there is also a corresponding included angle $Tr_2$ for the cavity having a magnitude that equals or exceeds the angle $Tr_1$, so that the reduced-width portion fits within the cavity.

As for the knife 80 of FIG. 25, the angle of reverse taper for the knife 180 is typically in the range 1-5 degrees, more preferably 1-3 degrees, and most preferably 1-2 degrees; that is, the angle of reverse taper is preferably the same regardless of which of the cutting edge insert and knife body carries the reduced-width portion.

Again with reference to the width dimension "W" of the knife, and where, as in the knife 180, the reduced-width portion is part of the knife body portion, reverse taper implies that the width of the reduced-width portion of the knife body portion increases in the direction toward the cutting edge insert portion.

With specific reference to the knife 80 of FIG. 25, to install the cutting edge insert portion 82 into the knife body portion 84 generally requires sliding the reduced-width portion 89 into the cavity 83 in a direction parallel to the elongate axis of the knife 80, perpendicular to the plane of the Figure and corresponding to the axis L in FIG. 1. By contrast, the cutting edge insert portion 22 of the knife 80 of FIG. 8 may be installed into the knife body portion 24 by bringing the two portions together along the axis indicated as "A."

Due to the reverse taper geometry, tightening the bolt 16 will tend, to some degree, to withdraw the TOP and BOTTOM sides of the reduced-width portion 89 from the walls of the cavity 83, and thereby permit a somewhat decreased stability of the cutting edge insert portion of the knife. On the other hand, less tightening of the bolt may be required, because the reduced-width portion will become more tightly wedged in the cavity 83 as soon as the two portions begin to separate. This latter consideration leads to two variations of the knife 80.

According to a first variation of the knife 80 illustrated in FIG. 27 as 80a, the bolt (here referenced as 16a) may be adapted for pushing on a REAR surface 87a of the reduced-width portion 89, to retain the cutting edge insert portion (referenced as 82a) to the knife body portion (referenced as 84a) as a result of more tightly wedging the reduced-width portion in the cavity 83, rather than pulling on it. In such case, the cutting edge insert 82a generally differs from the cutting edge insert 82 of the knife 80 by virtue of elimination of the mounting hole 81a, and the knife body portion 84a differs from the knife body portion 84 of the knife 80 by virtue of the knife mounting hole 81c being threaded.

As the bolt 16a is threadingly advanced in the threaded mounting hole 81c the force it applies to push the cutting edge insert portion 82a toward the FRONT of the knife is resisted by spreading of the walls 85a, 85b. So, to reduce stress concentration in this variation, the corners of the transition between the bottoming surface 87a of the cavity 83, and inside surfaces 88a, 88b of the walls 85a, 85b, at "$C_9$" and "$C_{10}$," are preferably radiused as shown.

According to a second variation of the knife 80 illustrated in FIG. 28 as 80b, the bolt 16 may be eliminated, and thus both mounting holes 81a and 81b of the knife 80 may also be eliminated, so that the cutting edge insert portion 82a (which the knife 80b may share with the knife 80a) is retained to the knife body portion 84c by virtue of geometry alone.

Similarly, the embodiments of FIGS. 11, 12, and 15 are also adapted so that they can be used with a bolt adapted for pushing, as described above in connection with the first variation of the knife 80, or without such a bolt, as described above in connection with the second variation. This is due to the mating geometry of the sides indicated as $28a_1$, $28a_2$, $28b_1$, and $28b_2$, particularly cooperating interfering separation resistance features 51a (FIG. 11), 51b (FIG. 12), and 51c (FIG. 15), which produce interfering resistance to separation of the cutting edge insert and knife body portions along the axis indicated as "A" in FIG. 8; more generally in the case where there is a bolt adapted for pushing on the cutting edge insert portion, in the direction the bolt is pushing, or more generally still, in directions in which the cutting edge insert portion would be moved either closer to or farther away from the bottoming surface 27a.

In that regard, it will be noted that the sides $28a_1$, $28a_2$, $28b_1$, and $28b_2$ are shown tapered, in the manner of the embodiment of FIG. 10. In embodiments where the cutting edge insert and knife body portions have cooperating interfering separation resistance features such as those shown in FIGS. 11, 12, and 15, and where the knife either employs no bolt for holding the cutting edge insert portion to the knife body portion, or employs one or more bolts having a resultant effect of pushing the cutting edge insert portion rather than pulling on it, these sides would more advantageously be provided with zero taper, in the manner of the embodiment of FIG. 9 or, still more advantageously, reverse taper, in the manner of the embodiment of FIG. 26, to increase the interfering resistance.

In the knife 80b it is desirable to seat the cutting edge insert portion on the knife body portion to no greater or lesser degree at the surfaces indicated in the vicinity of the reference designators "$C_{11}$" and "$C_{12}$" as at the interface between the REAR surface 87b of the reduced-width portion and the bottoming surface 87a of the cavity. Thus the knife 80b is an exception to the general rule noted above that the walls function as stand-offs.

Analogues to the knife variations 80a and 80b of FIGS. 27 and 28, relative to the knife 80 of FIG. 25, may be provided according to the same principles for the knife 180 of FIG. 26. That is, variations of the knife 180 may employ a bolt to push the cutting edge insert portion away from the knife body portion as in the knife 80a, or the bolt may be eliminated as in the knife 80b.

Figure 29:
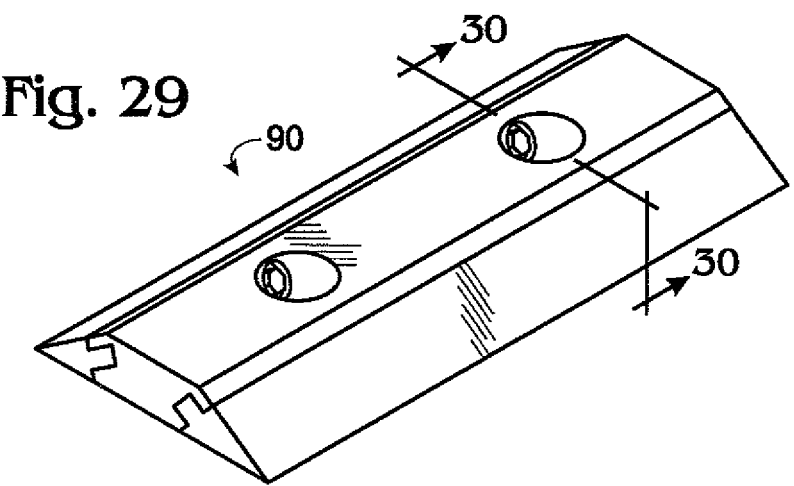
FIG. 29 is a perspective view of a double-sided knife having a knife body portion and two cutting edge insert portions according to the invention.
Figure 30:
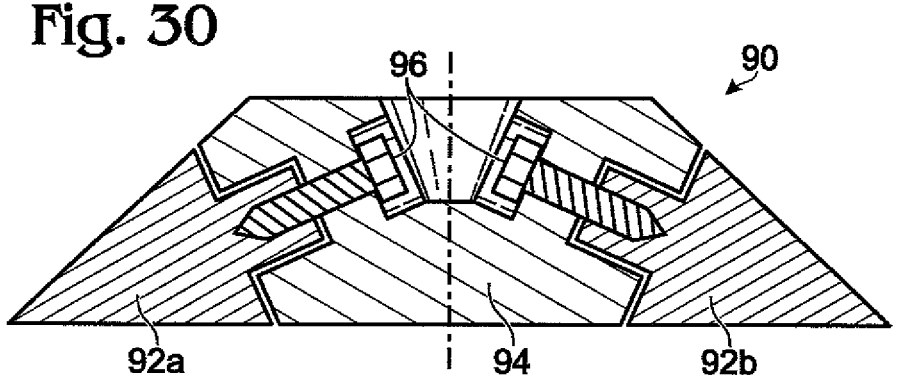
FIG. 30 is a cross-sectional view of the knife of FIG. 29 taken along the line 30-30 thereof.

Turning to FIGS. 29 and 30, a double-sided version of the knife 20 of FIG. 8 is shown, referenced as 90. The knife 90 has two cutting edge insert portions 92a and 92b disposed on opposite sides of a knife body portion 94. Two shorter bolts 96 function the same as the bolt 16 in FIG. 8, and access to the bolt heads may be obtained, if necessary, in the manner described in connection with FIG. 16.

Figure 31:
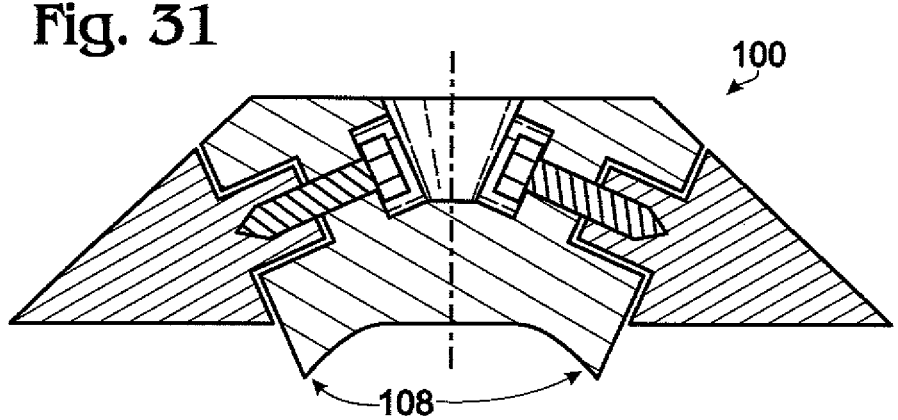
FIG. 31 is a cross-sectional view of a knife according to the invention for comparison with FIG. 30, representing an alternative to the knife of FIG. 30 which includes indexing features.

FIG. 31 shows a double-sided knife 100 that is the same as the knife 90 but has additional "deflector ridges" 108 as known in the art, for indexing the knife in a knife assembly. Any other of the numerous indexing features known in the art could alternatively be used, but deflector ridges are preferred.

Double-sided knives according to the invention could have just one cutting edge insert portion that is disposable, with the other cutting edge being monolithically part of the knife body portion, providing in a single knife one disposable and one permanent knife cutting edge.

One advantage that a double-sided knife having at least one disposable (and therefore removable) cutting edge insert portion can provide is the ability for an operator to quickly change the cutting angle θ. For example, a knife having one disposable cutting edge insert portion and one permanent cutting edge can employ a first cutting angle $θ_1$ in the disposable edge portion and a second, different cutting angle $θ_2$ in the permanent cutting edge. Moreover, the cutting angle $θ_3$ of the disposable cutting edge insert portion can be changed by replacing it with another disposable cutting edge insert portion having a different cutting angle $θ_3$.

Referring back to FIG. 6, the width W of the knife 20 is typically about ½" for cutting logs and lumber, and the bolt 16 can be less than 3/8" diameter. The width W of the knife 20 adapted for cutting waste plastic material is typically about 7/8". These width dimensions may vary at least +/−1/4".

The knives of FIGS. 6, 8,10-19, and 25-28, i.e., single-sided, double-walled embodiments, all define lengths "$L_1$" as shown in FIG. 6, with the knife body portions defining lengths length "$L_2$." For any of these knives, the length $L_2$ is greater than the width W; it is preferably at least two times greater than the width W; and it is typically about 4-5 times greater.

This consideration leads to two principles of construction for application to the knives of FIGS. 6, 8, 10-19, and 25-28. The first principle relates to construction of the cutting edge insert portion and is explained by reference to FIG. 32.

Figure 32:
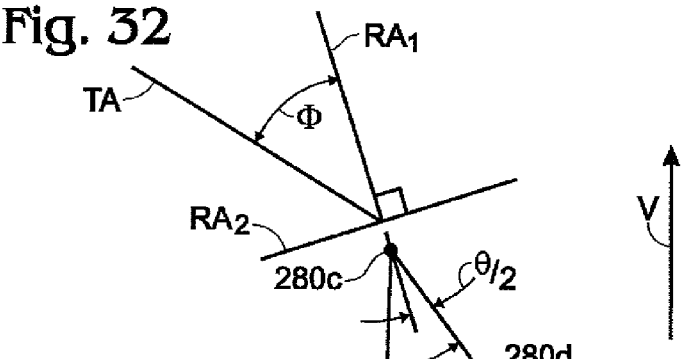
FIG. 32 is a side elevation of a generalized cutting edge insert portion according to the invention, illustrating a general principle of construction thereof.

In FIG. 32, the cutting edge insert portion is referenced generally as 282. It is understood to be part of a knife 280, the knife body portion of which is not shown. The cutting edge insert portion 282 includes a cutting edge 280c (seen as a point because it extends perpendicular to the plane of the Figure), and defines at least part of the top surface 280a, bottom surface 280b, and cutting-edge-joining surface 280d of the knife. Except in the vicinity of the cutting edge 280c, where the bottom surface 280b and the cutting-edge-joining surface 280d each define a straight line in any given plane perpendicular to the cutting edge 280c, these surfaces could have any shape, so a highly generalized shape is shown in FIG. 32 to indicate where the particular shape is not relevant to the first principle of construction, which is as follows.

The cutting angle is θ and a first reference line "$RA_1$" may be constructed that bisects the angle θ. A second reference line "$RA_2$" may also be constructed that is perpendicular to the line $RA_1$. A threshold angle line "TA" can next be constructed that is an angle Φ=45° from the reference lines $RA_1$ and $RA_2$. The significance of the line TA is that any line that is parallel thereto is equally aligned (or, equivalently, equally misaligned) with both reference lines.

The cutting edge insert portion 282 also has a mounting hole 283, having a mounting hole axis "$HA_1$." As drawn, the mounting hole axis $HA_1$ is parallel to the line TA, and thus the mounting hole axis is equally aligned with both reference lines $RA_1$ and $RA_2$. If the mounting hole axis $HA_1$ were tilted further toward the vertical "V" relative to the orientation shown, the mounting hole axis would be closer to being in alignment with the first reference line $RA_1$ than the second reference line $RA_2$; whereas, if the mounting hole axis $HA_1$ were tilted further away from the vertical V, it would be closer to being in alignment with the second reference line $RA_2$.

The aforedescribed first principle of construction is helpful to define, in general, the desired orientation relationship between the cutting edge insert portion mounting hole and the cutting angle, which is that the axis of the mounting hole in the cutting edge insert portion should be closer to being in alignment with the first reference line $RA_1$ than the second reference line $RA_2$.

For comparison, consider the same reference lines $RA_1$ and $RA_2$ constructed for the prior art knife assembly of FIG. 2. The hole axis "HA" of the clamp bolt 4 is much more closely aligned with the line $RA_2$, thus significantly failing to accord with the first principle of construction.

Figure 33:
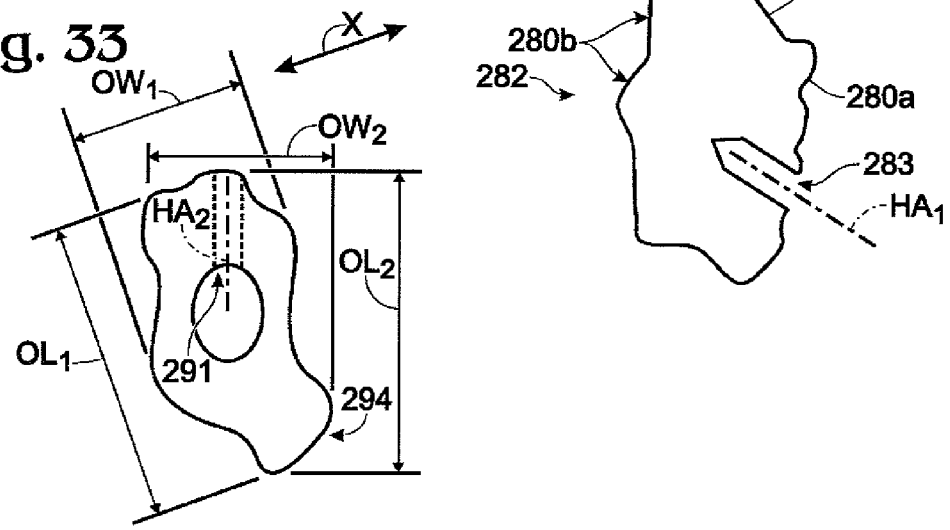
FIG. 33 is a side elevation of a generalized knife body portion according to the invention, illustrating a general principle of construction thereof.

The second principle relates to construction of the knife body portion and is explained by reference to FIG. 33. In FIG. 33, the knife body portion is referenced generally as 294. It is understood to be part of a knife 200, the cutting edge insert portion of which is 282 of FIG. 32.

The knife body portion 294 has a mounting hole 291 that, preferably but not necessarily, extends all the way through at least a portion of the knife body portion such as indicated. The knife body portion mounting hole 291 hole has a hole axis $HA_2$ that lies in the plane of the Figure.

In the same plane, the knife body portion can be viewed as having a number of overall widths "OW," e.g., $OW_1$ and $OW_2$, and overall lengths "OL," e.g., $OL_1$ and $OL_2$, with each overall width being perpendicular to the corresponding overall length (e.g., $OW_1$ is perpendicular to $OL_1$, and $OW_2$ is perpendicular to $OL_2$). The overall widths and overall lengths are maximum dimensions of the knife body portion in the directions these measurements are taken.

The knife body portion is "slender." To quantify that term, it may be taken to mean that there is no combination of overall width and overall length for which the ratio OL/OW is not at least 2; more preferably, the ratio is at least 3; and more preferably still, it is at least 4. The "slender dimension" is the direction of the measurement OL. The greater the minimum ratio OL/OW, the more slender the knife body portion.

In addition, the knife body portion mounting hole axis $HA_2$ should be such that the compressive stress, which is applied parallel to the knife body portion mounting hole axis 291, is applied more closely parallel to its "slender dimension" than to the perpendicular direction. Thus the axis $HA_2$ should be closer to being in alignment with the direction associated with OL than the direction associated with OW. This is to ensure that the compressive stress, because it is applied along the axis $HA_2$, is principally aligned with one of the knife body portion's "slender" dimensions.

The knives discussed above in connection with FIGS. 6, 8, 10-19 and 25-28, i.e., single-sided, double-walled embodiments, are intended primarily to be used as substitutes for existing knives of the type shown in FIG. 1, particularly in applications where the knife is bolted directly to the cutting head, i.e., where there is no "knife assembly." In such uses, they will result in a significant service cost advantage due to the relative ease with which the cutting edge insert portion, taken by itself, can be handled and serviced. The required compatibility will generally dictate the overall size and shape of the cutting edge insert and knife body portions as assembled.

Such knives may also be used in knife assemblies like that shown in FIG. 2, in which case they will generally be of smaller dimensions, though retaining the same proportions. For the originally provided, monolithic knives, it will either be cost-effective, or not, to simply dispose of the knife after the cutting edge is worn, rather than repair it. Using any one of the knives of FIGS. 6, 8, 10-19, and 25-28, it will be more likely that choosing a disposal strategy, rather than a repair strategy, will be cost-effective; and if it should be the case that a disposal strategy would be cost-effective either way, the savings will be greater.

In addition, knives having a cutting edge insert portion and a separate knife body portion according to the invention have been found to be as strong as or stronger than the standard monolithic knives that they may be used to replace, and so it is also advantageous to provide knives according to the invention as original equipment. In such cases, the knives may have any desired size or configuration. Accordingly, single-sided, double-walled knife embodiments according to the invention, as well as single-walled embodiments such as those illustrated in FIGS. 20-24, need not be slender as described above, particularly if they are not used as replacements for existing, slender knives.

Double-sided embodiments such as those illustrated in FIGS. 30 and 31, if provided as replacements for existing double-sided knives, would often violate the second principle of construction discussed above. As noted previously, double-sided knives are typically used only in knife assemblies, where the knives are indexed using indexing features (such as deflector ridges) on the bottom surface of the knife, and/or on the top surface of the knife. They are not suited to being indexed by butting the rear of the knife against a back-stop because, projecting from the rear of the knife is another cutting edge. Hence, double-sided knives, because they are used in knife assemblies for the purpose of gaining the advantage of reduced knife size, are generally of more compact dimensions, and as illustrated in FIGS. 30 and 31, do not generally have knife bodies that are "slender."

However, the invention allows for an additional capability in the relatively large knives of the type shown in FIG. 1 that are bolted directly to the cutting head and that are generally indexed at the rear surface 2f. Such knives would generally employ knife body portions that are slender.

Figure 34:
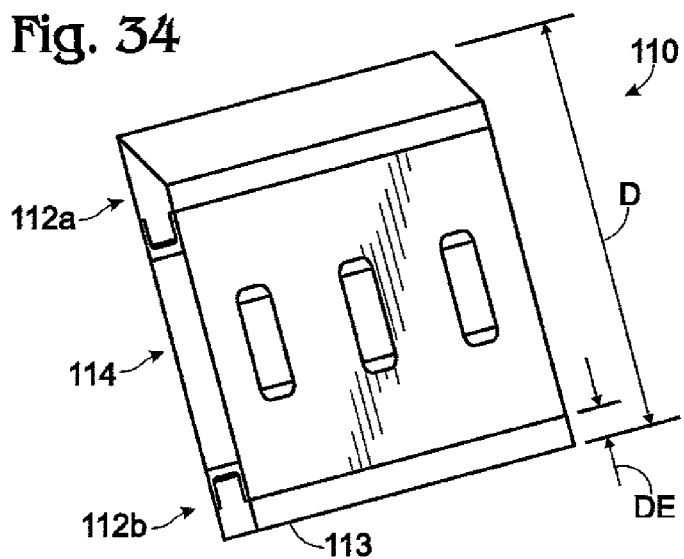
FIG. 34 is an isometric view of a double-sided knife according to the invention, with one of the sides having a cutting edge insert portion and the other side having an indexing insert portion according to the invention.

FIG. 34 shows an example. A knife 110 has a knife body portion 114 receiving, at one side thereof, a cutting edge insert portion 112a, and at the opposite side thereof, an indexing insert portion 112b. Both the cutting edge insert portion 112a and the indexing insert portion 112b may be mated to the knife body portion according to the principles established for the cutting edge inserts used in any of the knives of FIGS. 6, 8, 10-19, and 25-28.

However the indexing insert portion 112b, unlike the cutting edge insert portion 112a, can be advantageously used for indexing the knife by butting a rear surface 113 of the insert portion 112b against the back-stop of the cutting head (not shown) in the standard manner of indexing single sided knives. Thus the knife 110 provides for a single-sided knife by use of double-sided insert architecture.

The rear surface 113 of the indexing insert portion 112b may be penetrated by tapped holes or other cavities so that the indexing insert portion can be babbitted in the same manner that the rear end 2f of the knife 2 of FIG. 1 would be babbitted to re-index the knife, by extending its depth to compensate for wear of the cutting edge. Alternatively, a number of different indexing insert portions 112b may be provided, each affording a different knife depth extension "DE" when installed in the knife, so that instead of babbitting the knife to change its overall depth "D," the operator simply chooses an indexing insert portion with a suitable depth extension DE.

Figure 35:
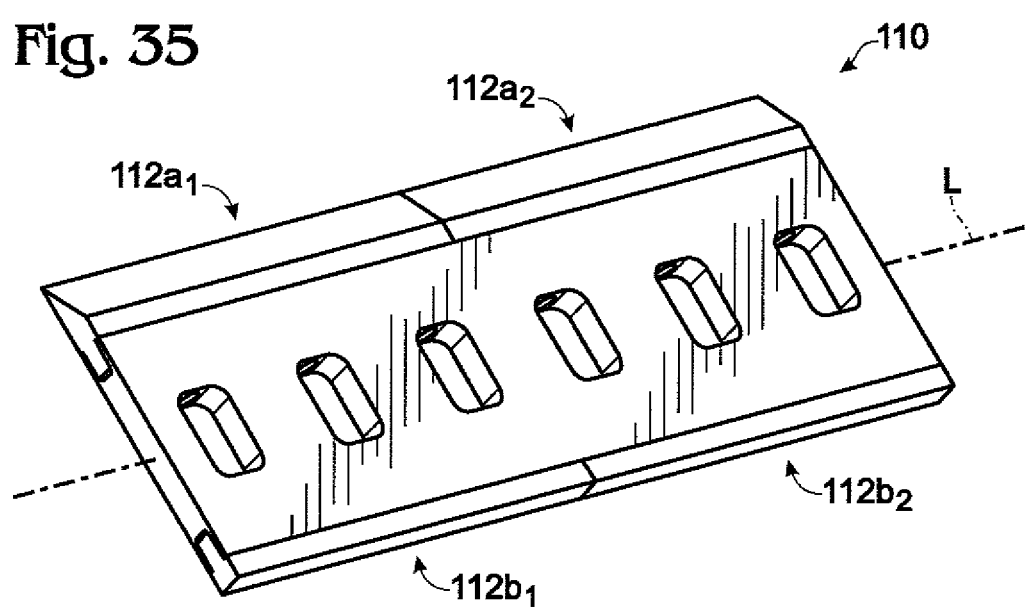
FIG. 35 is an isometric view of the knife of FIG. 34 with multiple cutting edge insert and indexing insert portions.

FIG. 35 shows a knife 111 which is like the knife 110 except that it has multiple insert portions, in this case two, namely 113a$_1$ and 113a$_2$, it being understood that there could be more, and multiple indexing portions, in this case two, namely 113b$_1$ and 113b$_2$, it again being understood that there could be more, arrayed sequentially along the direction of the elongate axis "L" of the knife. Thus the insert portions and indexing portions are segmented, each segment being shorter than the overall length of the knife, and separately replaceable. Any of the knives described herein may be provided with segmented insert or indexing portions as desired.

It is to be understood that, while a specific knife with disposable cutting edge has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A composite knife having a cutting edge and defining an acute cutting angle for the cutting edge, the cutting angle establishing, in a selected reference plane perpendicular to the cutting edge, a first reference axis that bisects the cutting angle and a second reference axis perpendicular to the first reference axis, the composite knife comprising:
   a cutting edge insert having a front end that includes the cutting edge and a threaded insert mounting hole; and
   a knife body for removably mounting the insert, the knife body having a body mounting hole adapted to align with the insert mounting hole when the insert is mounted to the knife body, so that the insert mounting hole and knife body mounting hole share a common hole axis;
   the cutting edge insert and knife body being cooperatively adapted so that, in an operative, assembled configuration of the knife in which an elongate fastener is inserted through the body mounting hole and a threaded end of the fastener is threaded into the insert mounting hole and the fastener is tightened so as to produce a compressive force between the cutting edge insert and the knife body directed along the common hole axis for removably mounting the cutting edge insert to the knife body, the insert will contact the knife body at respective compression supporting surfaces of the cutting edge insert and knife body, and an interlocking portion of the cutting edge insert will mate with a corresponding interlocking portion of the knife body, the interlocking portions being distinct from the respective compression supporting surfaces, wherein the common hole axis is closer to being parallel to the first reference axis than the second reference axis.

2. The composite knife of claim 1, wherein one of the interlocking portions is male and the other of the interlocking portions is female, wherein the male and female interlocking portions have respective mating surfaces distinct from the respective compression supporting surfaces, and respective end surfaces distinct from the respective mating surfaces, with the respective mating surfaces disposed between the respective compression supporting surfaces and the respective end surfaces, and wherein, in said operative, assembled configuration of the knife, the respective mating surfaces make snug contact and are oriented relative to the common hole axis so as to laterally stabilize the male interlocking portion within the female interlocking portion without sustaining a significant amount of the compressive force, and the respective end surfaces face one another and are spaced apart from one another along the common hole axis to allow for the remainder of the compressive force being concentrated at the compression supporting surfaces.

3. The composite knife of claim 2, wherein the knife body defines opposed top and bottom surfaces that define lines in the selected reference plane, at least principal portions of which are parallel to each other, the knife body therefore defining in the selected reference plane an overall length measured parallel to the principle portions, wherein the axis of the body mounting hole is substantially parallel to the overall length dimension.

4. The composite knife of claim 2, wherein, in the selected reference plane, the knife body defines overall length and width dimensions measured perpendicular to each other, wherein the overall length dimension is at least twice the overall width dimension, and wherein the axis of the body mounting hole is closer to being parallel to the overall length dimension than the overall width dimension.

5. The composite knife of claim 4, wherein the knife body defines opposed top and bottom surfaces that define lines in the selected reference plane, at least principal portions of which are parallel to each other, the knife body therefore defining in the selected reference plane an overall length measured parallel to the principle portions, wherein the axis of the body mounting hole is substantially parallel to the overall length dimension.

6. The composite knife of claim 1, wherein, in the selected reference plane, the knife body defines overall length and width dimensions measured perpendicular to each other, wherein the overall length dimension is at least twice the overall width dimension, and wherein the axis of the body mounting hole is closer to being parallel to the overall length dimension than the overall width dimension.

7. The composite knife of claim 6, wherein the knife body defines opposed top and bottom surfaces that define lines in the selected reference plane, at least principal portions of which are parallel to each other, the knife body therefore defining in the selected reference plane an overall length measured parallel to the principle portions, wherein the axis of the body mounting hole is substantially parallel to the overall length dimension.

8. The composite knife of claim 1, wherein the knife body defines opposed top and bottom surfaces that define lines in the selected reference plane, at least principal portions of which are parallel to each other, the knife body therefore defining in the selected reference plane an overall length measured parallel to the principle portions, wherein the axis of the body mounting hole is substantially parallel to the overall length dimension.

9. A method for cutting an article, comprising:
providing a composite knife having a cutting edge and defining an acute cutting angle for the cutting edge, the cutting angle establishing, in a selected reference plane perpendicular to the cutting edge, a first reference axis that bisects the cutting angle and a second reference axis perpendicular to the first reference axis, the composite knife including a cutting edge insert having a front end that includes the cutting edge and a threaded insert mounting hole, and a knife body for removably mounting the insert, the knife body having a body mounting hole adapted to align with the insert mounting hole when the insert is mounted to the knife body, so that the insert mounting hole and knife body mounting hole share a common hole axis;
producing an operative, assembled configuration of the knife including inserting an elongate fastener through the body mounting hole, threading a threaded end of the fastener into the insert mounting hole, and tightening the fastener so as to produce a compressive force between the cutting edge insert and the knife body directed along the common hole axis and thereby removably mounting the cutting edge insert to the knife body so that the insert contacts the knife body at respective compression supporting surfaces of the cutting edge insert and knife body, and an interlocking portion of the cutting edge insert mates with a corresponding interlocking portion of the knife body, the interlocking portions being distinct from the respective compression supporting surfaces, wherein the common hole axis is closer to being parallel to the first reference axis than the second reference axis; and
using the knife in said operative, assembled configuration to cut the article.

10. The method of claim 9, further comprising installing the knife in said operative, assembled configuration in a rotating cutting head to perform the step of using the knife to cut the article.

11. The method of claim 10, wherein, in the selected reference plane, the knife body defines overall length and width dimensions measured perpendicular to each other, comprising providing for the overall length dimension being at least twice the overall width dimension, and providing that the axis of the body mounting hole is closer to being parallel to the overall length dimension than the overall width dimension.

12. The method of claim 11, wherein the knife body defines opposed top and bottom surfaces that define lines in the selected reference plane, providing for at least principal portions of said lines being parallel to each other, the knife body therefore defining in the selected reference plane an overall length measured parallel to the principle portions, and providing for the axis of the body mounting hole being substantially parallel to the overall length dimension.

13. The method of claim 10, wherein the knife body defines opposed top and bottom surfaces that define lines in the selected reference plane, providing for at least principal portions of said lines being parallel to each other, the knife body therefore defining in the selected reference plane an overall length measured parallel to the principle portions, and providing for the axis of the body mounting hole being substantially parallel to the overall length dimension.

14. The method of claim 10, further comprising providing for one of the interlocking portions being male and the other of the interlocking portions being female, providing for the male and female interlocking portions having respective mating surfaces distinct from the respective compression supporting surfaces, and respective end surfaces distinct from the respective mating surfaces, with the respective mating surfaces disposed between the respective compression supporting surfaces and the respective end surfaces, providing for the respective mating surfaces making snug contact and being oriented relative to the common hole axis so as to laterally stabilize the male interlocking portion within the female interlocking portion without sustaining a significant amount of the compressive force, and providing for the end surfaces facing one another and being spaced apart from one another along the common hole axis to allow for the remainder of the compressive force being concentrated at the compression supporting surfaces.

15. The method of claim 14, wherein, in the selected reference plane, the knife body defines overall length and width dimensions measured perpendicular to each other, comprising providing for the overall length dimension being at least twice the overall width dimension, and providing that the axis of the body mounting hole is closer to being parallel to the overall length dimension than the overall width dimension.

16. The method of claim 15, wherein the knife body defines opposed top and bottom surfaces that define lines in the selected reference plane, providing for at least principal portions of said lines being parallel to each other, the knife body therefore defining in the selected reference plane an overall length measured parallel to the principle portions, and providing for the axis of the body mounting hole being substantially parallel to the overall length dimension.

17. The method of claim 14, wherein the knife body defines opposed top and bottom surfaces that define lines in the selected reference plane, providing for at least principal portions of said lines being parallel to each other, the knife body therefore defining in the selected reference plane an overall length measured parallel to the principle portions, and providing for the axis of the body mounting hole being substantially parallel to the overall length dimension.

18. The method of claim 9, further comprising providing for one of the interlocking portions being male and the other of the interlocking portions being female, providing for the male and female interlocking portions having respective mating surfaces distinct from the respective compression supporting surfaces, and respective end surfaces distinct from the respective mating surfaces, with the respective mating surfaces disposed between the respective compression supporting surfaces and the respective end surfaces, providing for the respective mating surfaces making snug contact and being oriented relative to the common hole axis so as to laterally stabilize the male interlocking portion within the female interlocking portion without sustaining a significant amount of the compressive force, and providing for the end surfaces facing one another and being spaced apart from one another along the common hole axis to allow for the remainder of the compressive force being concentrated at the compression supporting surfaces.

19. The method of claim 18, wherein the knife body defines opposed top and bottom surfaces that define lines in the selected reference plane, providing for at least principal portions of said lines being parallel to each other, the knife body therefore defining in the selected reference plane an overall length measured parallel to the principle portions, and providing for the axis of the body mounting hole being substantially parallel to the overall length dimension.

20. The method of claim 18, wherein, in the selected reference plane, the knife body defines overall length and width dimensions measured perpendicular to each other, comprising providing for the overall length dimension being at least twice the overall width dimension, and providing that the axis of the body mounting hole is closer to being parallel to the overall length dimension than the overall width dimension.

21. The method of claim 20, wherein the knife body defines opposed top and bottom surfaces that define lines in the selected reference plane, providing for at least principal portions of said lines being parallel to each other, the knife body therefore defining in the selected reference plane an overall length measured parallel to the principle portions, and providing for the axis of the body mounting hole being substantially parallel to the overall length dimension.

22. The method of claim 9, wherein, in the selected reference plane, the knife body defines overall length and width dimensions measured perpendicular to each other, comprising providing for the overall length dimension being at least twice the overall width dimension, and providing that the axis of the body mounting hole is closer to being parallel to the overall length dimension than the overall width dimension.

23. The method of claim 22, wherein the knife body defines opposed top and bottom surfaces that define lines in the selected reference plane, providing for at least principal portions of said lines being parallel to each other, the knife body therefore defining in the selected reference plane an overall length measured parallel to the principle portions, and providing for the axis of the body mounting hole being substantially parallel to the overall length dimension.

24. The method of claim 9, wherein the knife body defines opposed top and bottom surfaces that define lines in the selected reference plane, providing for at least principal portions of said lines being parallel to each other, the knife body therefore defining in the selected reference plane an overall length measured parallel to the principle portions, and providing for the axis of the body mounting hole being substantially parallel to the overall length dimension.

* * * * *